United States Patent

[11] 3,617,726

| [72] | Inventors | Yushi Uchida;<br>Mineki Watanabe; Sadamu Ohteru;<br>Hiroshi Kobayashi, all of Tokyo, Japan |
|---|---|---|
| [21] | Appl. No. | 877,273 |
| [22] | Filed | Nov. 17, 1969 |
| [45] | Patented | Nov. 2, 1971 |
| [73] | Assignee | Nippon Electric Company Limited<br>MInato-ku, Tokyo, Japan |
| [32] | Priorities | Nov. 17, 1968 |
| [33] | | Japan |
| [31] | | 43/83877;<br>Jan. 14, 1969, Japan, No. 44/3014 |

[54] AUTOMATIC WAVEFORM ANALYZING APPARATUS FOR OBSERVING ARBITRARY WAVEFORMS BY THE SYNTHESIS OF A PLURALITY OF OPTIMUMLY WEIGHTED FUNDAMENTAL WAVEFORMS
10 Claims, 12 Drawing Figs.

[52] U.S. Cl. ............................................. 235/197,
324/77, 328/14
[51] Int. Cl. ......................................................... G06g 7/26
[50] Field of Search ........................................... 235/197,
193, 150.1, 181, 150.53, 184; 324/77; 328/14

[56] References Cited
UNITED STATES PATENTS

| 3,305,675 | 2/1967 | Haase | 235/197 |
| 3,340,469 | 9/1967 | Catherall et al. | 324/77 B X |
| 3,360,724 | 12/1967 | Guros et al. | 324/77 CS |
| 3,470,468 | 9/1969 | Halpern | 324/77 E |
| 3,513,301 | 5/1970 | Howe | 235/197 X |
| 3,529,142 | 9/1970 | Robertson | 235/197 X |

Primary Examiner—Joseph F. Ruggiero
Attorney—Marn & Jangarathis

ABSTRACT: Automatic waveform analyzing apparatus for deriving arbitrary waveforms by the synthesis of a plurality of optimumly weighted fundamental waveforms whose optimum weighting factors are determined by repeatedly sampling said plurality of fundamental waveforms at a plurality of sampling points and modifying previously established values for such weighting factors in response to values obtained at each sampling point is provided in accordance with the teachings of the present invention. In the automatic waveform analyzing apparatus according to the present invention, a plurality of analog memory elements are disposed in accordance with the sampling points selected such that one such analog memory elements is associated with each sampling point. The analog memory elements are read and each readout pulse derived therefrom is branched and apportioned into a plurality of output signals representing the value of each fundamental waveform as evaluated at the sampling point associated with the analog storage element producing such readout pulse. The branched and apportioned output signals from all of the analog memory elements are then selectively added on the basis of the correspondence of the associated fundamental waveforms associated therewith and a summation signal is produced for each fundamental waveform relied upon. Each summation signal produced is then apportioned on the basis of the value of the fundamental waveform associated therewith at each of the sampling points selected. Such apportioned values are then selectively added and compared to corresponding values of the arbitrary waveform. The analog storage element associated with the sampling point at which the selective addition and comparison has taken place has its contents selectively modified. This operation is repeatedly performed at each sampling point until the selective comparison indicates that an equivalent waveform has been synthesized.

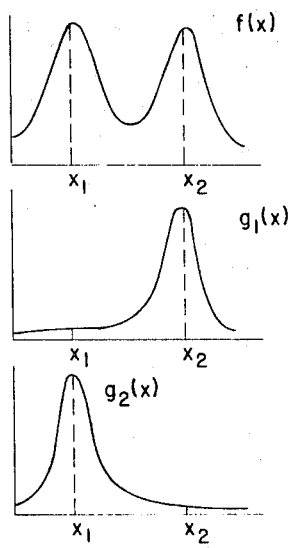
Fig. 1a.
Fig. 1b.
Fig. 1c.
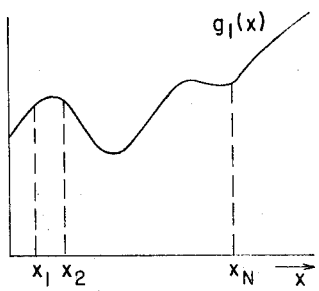
Fig. 3a.
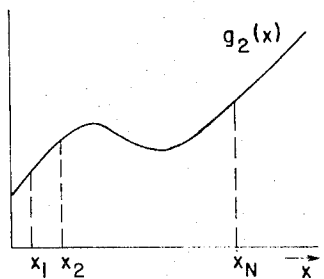
Fig. 3b.
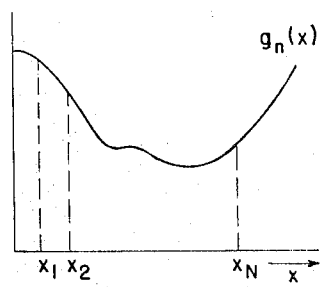
Fig. 3c.
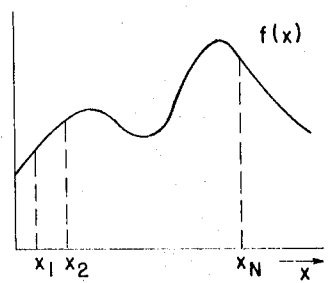
Fig. 3d.

Fig. 4.
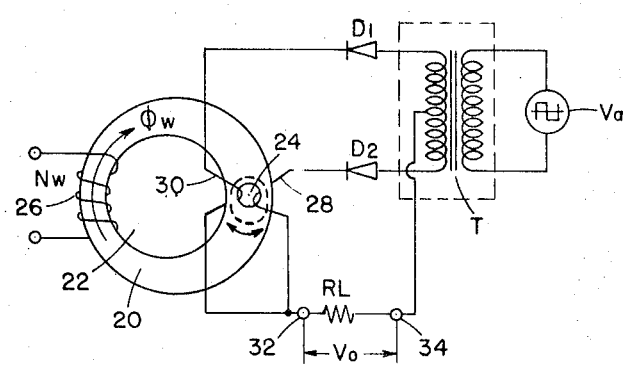
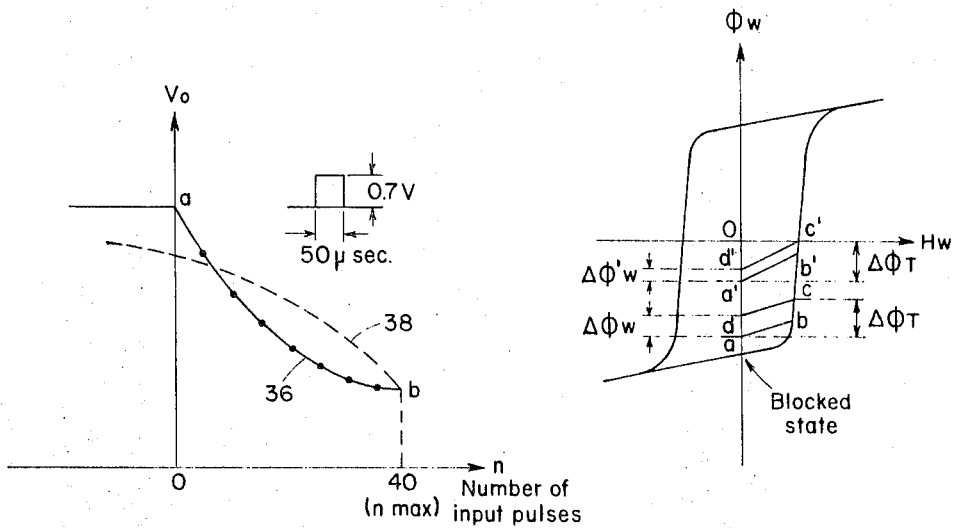
Fig. 5.
Fig. 6.

AUTOMATIC WAVEFORM ANALYZING APPARATUS FOR OBSERVING ARBITRARY WAVEFORMS BY THE SYNTHESIS OF A PLURALITY OF OPTIMUMLY WEIGHTED FUNDAMENTAL WAVEFORMS

This invention relates to waveform analyzing apparatus and more particularly to automatic waveform analyzing apparatus wherein magnetic analog memory elements are relied upon to achieve the optimum weighting factors for synthesizing an arbitrary waveform from a plurality of known waveforms according to perception principles.

It is known that any arbitrary waveform $f(x)$ may be synthesized from a plurality of known fundamental waveforms $g_1(x)...g_n(x)$. One conventional procedure for accomplishing a synthesis of this type is to provide each fundamental waveform $g_1(x)...g_n(x)$ with an appropriate, optimized weighting factor $W_{opt1}...W_{optn}$ and thereafter obtaining the desired arbitrary waveform $f(x)$ from the summation of the products of each fundamental waveform $g(x)$ and its associated, optimized weighting factor $W_{opt}$. In such conventional procedure, as both the desired arbitrary waveform $f(x)$ is known and the fundamental waveforms $g_1(x)...g_n(x)$ are either known or readily obtainable, only the appropriate, optimized weighting factors $W_{opt1}...W_{optn}$ need be empirically developed. The development of an appropriate, optimized weighting factor $W_{opt}$ for each fundamental waveform $g(x)$ may be conveniently accomplished according to perception principles. Briefly, the technique employed to derive such appropriate, optimized weighting factors $W_{opt1}...W_{optn}$ in this manner contemplates initially assigning arbitrary weighting factors $W_{10}...W_{n0}$ to each fundamental waveform and selecting a plurality of sampling points $x_1...x_N$ along the time or frequency axis of the arbitrary waveform $f(x)$ being synthesized. Thereafter, the amplitude of the summation of the products of each fundamental waveform $g_1(x)...g_n(x)$ and its associated, arbitrarily assigned weighting factor $W_{10}...W_{n0}$ is compared to the amplitude of the desired arbitrary waveform $f(x)$ at a first sampling point $x_1$. The arbitrarily assigned weighting factors $W_{10}...W_{n0}$ are then modified to reflect such comparison whereby a set of modified weighting factors $W_{11}...W_{n1}$ is obtained. The summation of the products of each fundamental waveform $g_1(x)...g_n(x)$ and its associated assigned weighting factor, as modified, $W_{11}...W_{n1}$ is then compared to the amplitude of the desired waveform $f(x)$ at a second sampling point $x_2$ and a new set of modified weighting factors $W_{12}...W_{n2}$ is then obtained. This procedure is repeated at each sampling point $x_1...x_N$ until the summation and comparison has been applied at the last sampling point $x_N$. Thereafter, the summation and comparison procedure is repeated in the foregoing manner, at each sampling point $x_1...x_N$ until the values of the repeatedly modified weighting factors $W_1...W_n$ each converge to an optimum value $W_{opt1}...W_{optn}$, respectively, whereat the appropriate, optimized weighting factors $W_{opt1}...W_{optn}$ are obtained. In this manner, the requisite synthesis can be achieved.

Although the foregoing procedure for synthesizing a desired arbitrary waveform $f(x)$ may appear quite tedious from the standpoint of the empirical techniques employed to develop the requisite optimized weighting factors $W_{opt1}...W_{optn}$, this procedure has proven to be a highly attractive mode of operation in automatic waveform analyzing apparatus using analog techniques. As will be appreciated from the brief description of the mode of synthesis set forth above, the circuit portions of such automatic waveform analyzing apparatus devoted to the development of the optimized weighting factors $W_{opt1}...W_{optn}$ comprise an extremely critical portion of such automatic waveform analyzing apparatus whose operation must be exceedingly accurate. The circuit portions of such automatic waveform analyzing apparatus devoted to the development of the optimized weighting factors $W_{opt1}...W_{optn}$ are generally denominated the variable weighting unit, and must be capable of storing a value representing the status of a particular weighting factor prior to the modification thereof and varying such value in accordance with modifying signals received thereby. The variable weighting unit, conventionally relies upon analog circuit elements so that automatic learning techniques may be employed.

In one conventional form of automatic waveform analyzing apparatus, the variable weighting unit relied upon consists of a plurality of analog circuit elements whose operation is controlled by mechanical positioning means. This conventional type of variable weighting unit typically employs analog circuit elements which take the form of potentiometer means driven by servomotor means wherein the mechanical contact between the resistance portion of the potentiometer means and the variable position tap or taps thereon determines the condition of each analog circuit element. Variable weighting units taking this form are advantageous because they exhibit completely nondestructive readout capabilities, are quite accurate over a wide range and may be relied upon to make small, final modifications in the value of their associated weighting factors. However, despite these advantages, variable weighting units employing analog circuit elements whose operation is based on the position of a movable mechanical contact are not preferred for use in automatic waveform analyzing apparatus because their response is too slow for expeditious use with the complex empirical procedure employed, their reliability is low, the manufacturing costs involved in producing variable weighting units of this type are disproportionately high and the resulting structure is large in size.

As an alternative to the analog circuit elements whose operation is based on the position of a movable contact, as described above, magnetic analog memory elements have been substituted for the analog circuit elements of variable weighting units relied upon in conventional automatic waveform analyzing apparatus. These magnetic analog memory elements generally take the form of multiaperture cores having a major aperture dedicated to the receipt of write-in pulses and a minor aperture which is relied upon for reading. One multiaperture core is generally associated with each fundamental waveform $g_1(x)...g_n(x)$ and the write pulses applied to each multiaperture core are applied thereto through a previously calibrated voltage dividing network having a tap thereon associated with each previously established sampling point $x_1...x_N$. Thus, the write-in pulses applied to the major aperture of each multiaperture core have an amplitude which reflects the sampling point $x_1...x_N$ at which the comparison takes place for the fundamental waveform $g_1(x)...g_n(x)$ associated therewith. As such multiaperture cores act in the well-known manner to vary the switchable flux about the read apertures thereof, in response to each write-in pulse applied to the major or write aperture, this form of magnetic analog memory element will appropriately act over a predetermined range to store the status of the weighting factor for the fundamental waveform associated therewith as a discrete flux level and respond to modifying signals, applied thereto in the form of write-in pulses whose magnitude represents the sampling point value for that waveform, to vary the switchable flux about the read aperture and hence the value of such weighting factor. Furthermore, as such multiaperture cores are highly stable, provide rapid response times and are highly compact; variable weighting units relying upon such magnetic analog memory elements possess a plurality of advantages over variable weighting units employing analog circuit elements whose operation is based upon the position of a movable mechanical contact.

Although conventional automatic waveform analyzing apparatus employing variable weighting units relying upon magnetic analog memory elements in the form of multiaperture cores possess a number of substantial advantages over analyzing apparatus wherein the variable weighting units are formed of analog circuit elements whose operation is dependent upon the position of a movable mechanical contact, a number of disadvantages also attach to the use of such magnetic analog memory elements in the manner specified above in said variable weighting units. One disadvantage which is present in that multiaperture cores do not exhibit an ideal, rectangular hysteresis loop. Therefore, as a separate multiaperture core is associated with each fundamental waveform $g_1(x)...g_n(x)$, and the amplitude of the write-in pulse applied to the major aperture of each core for a given sampling point will often differ, it will be appreciated that each such core will often operate on different portions of their respective hysteresis loops. Thus, as the hysteresis loops exhibited by such multiaperture cores are not rectangular, and the magnitude of the readout pulses derived therefrom is a function of the point of operation on such hysteresis loop; the write-in pulses, which serve as modifying pulses, will have a variable effect on each core being modified and a uniform modification will not be achieved at each core as each write-in pulse is received. Accordingly, it will be appreciated that when these conditions obtain, the convergence of each weighting factor $W_1...W_n$ to an optimum value $W_{opt1}...W_{optn}$ may not be easily and precisely achieved. Furthermore, as each multiaperture core may be operated at a different position on its hysteresis loop, due to the application of write-in pulses of different magnitudes thereto, certain of such cores will be quickly driven away from their initial starting points to a point on the hysteresis loop where operation is limited while others of such cores will be slowly driven away from their initial starting points. Thus, such quickly driven cores will limit the range of modification within which the entire group of multiaperture cores may operate to thereby limit the range of operation of the variable weighting unit so that minor adjustments in the flux levels of each multiaperture core, as necessary to optimize the value of each weighting factor, may not be achieved after a given core has arrived at a limiting point on its hysteresis loop.

Another disadvantage which attends the use of multiaperture cores, in the manner specified above, stems from the fact that ideal nondestructive readout can not be obtained therefrom in the absence of an ideal rectangular hysteresis loop and that the degree to which the flux level changes upon readout is a function of that flux level as characterized by the point of operation on the hysteresis loop. Although multiaperture cores having separate write and read apertures may be considered to be ideally nondestructive readout devices from a digital standpoint, i.e., where the readout pulses need only represent a one or a zero; where analog operation is utilized and the magnitude of a readout pulse must represent the flux level of the core, ideal nondestructive readout characteristics can not be obtained because perfect isolation is not obtained between the write aperture and the read aperture. Furthermore, the degree to which irreversible flux switching occurs upon readout is a function of the flux level of the core and hence the point of operation on the hysteresis loop. Therefore, although such readout characteristics will not usually present a substantial difficulty with regard to analog operation, they will serve to substantially limit the range within which analog operation is available. In addition, where a plurality of multiaperture cores are operated at different points on their respective hysteresis loops and receive write-in pulses at the same instant, as soon as one multiaperture core reaches the limit of available operation, the application of write-in pulses to the entire group must terminate despite the need for further optimization.

Therefore, it is an object of this invention to provide automatic waveform analyzing apparatus having a variable weighting unit therein which is highly reliable and adapted to rapidly converge the weighting factors developed to a precise approximation of their optimum values.

An additional object of this invention is to provide automatic waveform analyzing apparatus having a variable weighting unit therein formed of a plurality of multiaperture cores wherein said plurality of multiaperture cores are so disposed and so connected that each multiaperture core receives write-in pulses of the same magnitude and only one multiaperture core is associated with a particular sampling point.

A further object of this invention is to provide automatic waveform analyzing apparatus having a variable weighting unit therein formed of a plurality of multiaperture cores wherein only one of such plurality of multiaperture cores is associated with all of the weighting factor determinations at a particular sampling point so that all such weighting factor determinations made at such sampling point are made at a common operation portion of the hysteresis loop of said one multiaperture core and only said one multiaperture core has its flux level modified in response to the determinations made at such sampling point.

Other objects and advantages of this invention will become clear from the following detailed description of an exemplary embodiment thereof, and the novel features will be particularly pointed out in conjunction with the appended claims.

In accordance with this invention, automatic waveform analyzing apparatus is provided including a variable weighting unit adapted to produce signals representative of a weighting factor for each fundamental waveform at each sampling point selected, means for discretely apportioning each representative signal in accordance with the value of the fundamental waveform associated therewith at a given sampling point, means for summing each apportioned representative signal and comparing the sum derived therefrom against a value representative of the signal to be analyzed at that sampling point, and means for deriving a modifying signal from said comparison and applying a pulse representative of such modifying signal to the variable weighting unit as an input thereto; said variable weighting unit comprising a plurality of multiaperture cores wherein each of said plurality of multiaperture cores is disposed so that only on multiaperture core is associated with a given sampling point and means connected to an output of each of said plurality of multiaperture cores for branching and apportioning output pulses therefrom so as to render such branched output pulses representative of the value of each weighting factor of each fundamental waveform relied upon.

The invention will be more clearly understood by reference to the following detailed description of an exemplary embodiment thereof in conjunction with the accompanying drawings in which:

FIGS. 1A–1C show waveforms illustrative of a technique of waveform synthesis;

FIGS. 3A–3D show waveforms illustrative of the waveform synthesis techniques employed in both conventional automatic waveform analyzing apparatus and the automatic waveform analyzing apparatus according to the present invention;

FIG. 4 shows a magnetic analog memory element employing a multiaperture core in the manner conventionally relied upon in automatic waveform analyzing apparatus;

FIG. 5 illustrates the voltage output characteristics of the magnetic analog memory element of FIG. 4 as a function of the number of input pulses applied thereto;

FIG. 6 illustrates the hysteresis characteristics of the magnetic analog memory element of FIG. 4.

Figure 2:
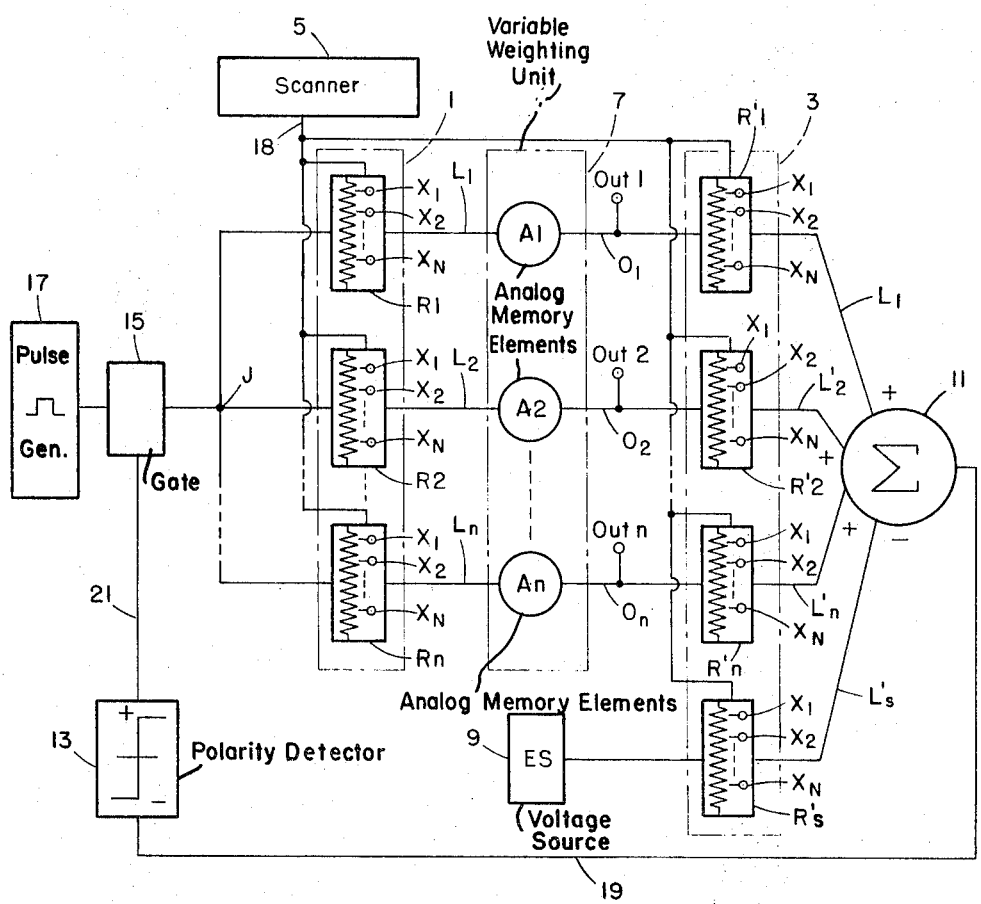
FIG. 2 shows conventional automatic waveform analyzing apparatus of the type employing magnetic analog memory elements in the variable weighting unit thereof.

Referring now to the drawings and more particularly to FIGS. 1A–1C thereof, there is shown a plurality of waveforms illustrative of a technique of waveform synthesis. If it is assumed that the waveform $f(x)$ shown in FIG. 1A is a designated arbitrary waveform to be synthesized, while the waveforms $g_1(x)$ and $g_2(x)$ shown in FIGS. 1B and 1C, respectively, are assumed to be the fundamental waveforms for synthesizing such arbitrary waveform $f(x)$, it will be apparent to those of ordinary skill in the art that the requisite synthesis may be accomplished according to the equation:

$$f(x) \cong W_{opt1} \cdot g_1(x) + W_{opt2} \cdot g_2(x),$$

where $W_{opt1}$ and $W_{opt2}$ are the so-called optimum weighting factors for achieving the requisite synthesis. In order to obtain appropriate values for the optimum weighting factors $W_{opt1}$ and $W_{opt2}$ an empirical technique has been conventionally employed wherein a value $W_1$ and $W_2$ for each weighting factor is arbitrarily selected and each waveform $f(x)$, $g_1(x)$ and $g_2(x)$ is sampled at a plurality of sampling points $x$ while the values of the weighting factors $W_1$ and $W_2$ are modified or varied until the value of $f(x)$ at each sampling point is closely approached by the sum of the products of $W_1g_1(x)$ and $W_2g_2(x)$ at each sampling point. If it is further assumed, for the purposes of explanation, that only two sampling points $x_1$ and $x_2$, as illustrated in FIGS. 1A-1C are to be utilized, this empirical technique may be briefly described in conjunction with FIGS. 1A-1C. Accordingly, assuming that two values $W_{10}$ and $W_{20}$ are initially and arbitrarily selected for the values of weighting factors $W_1$ and $W_2$, the sum of the products of each weighting factor $W_{10}$ and $W_{20}$ is multiplied by the value of their associated fundamental waveforms $g_1(x_1)$ and $g_2(x_1)$, respectively, at a first sampling point $x_1$ and the value obtained therefrom is compared to the value of the arbitrary waveform $f(x_1)$ at such first sampling point $x_1$. Thus, the value of $W_{10}g_1(x_1)+W_{20}g_2(x_2)$ is compared to the value of the arbitrary waveform $f(x_1)$ at the first sampling point. If any difference in the quantities compared is detected, such difference is utilized to modify the initial weighting factors $W_{10}$ and $W_{20}$ selected. Since, as is shown in FIGS. 1C and 1B, respectively, the magnitude of the fundamental waveform $g_2(x)$ at the first sampling point $x_1$ is larger than the magnitude of the fundamental waveform $g_1(x)$ at said first sampling point $x_1$, the weighting factor $W_{20}$ associated with the fundamental waveform $g_2(x)$ is modified to a larger extent than the weighting factor $W_{10}$ associated with the fundamental waveform $g_1(x)$ by modifying such weighting factors $W_{10}$ and $W_{20}$ in proportion to the ratio of $g_2(x_1)/g_1(x_1)$. If it is assumed that after the foregoing comparison and modification, the resulting weighting factors $W_{11}$ and $W_{21}$ associated with the fundamental waveforms $g_1(x)$ and $g_2(x)$, respectively, are obtained, the comparison is again performed at the next sampling point $x_2$ using the newly obtained weighting factors $W_{11}$ and $W_{21}$. Thus, the quantity $W_{11}g_1(x_2)+W_{12}g_2(x_2)$ is compared against the value of $f(x_2)$ and hence the newly obtained weighting factors $W_{11}$ and $W_{21}$ are checked at the second sampling point $x_2$ so as to determine whether or not an optimum value therefor has been achieved. As the magnitude of the fundamental waveform $g_1(x_2)$ is larger than the magnitude of the fundamental waveform $g_2(x_2)$ at the second sampling point $x_2$, the weighting factors $W_{11}$ and $W_{21}$ will be modified in response to any difference in the quantities compared in proportion to the ratio $g_1(x_2)/g_2(x_2)$, wherein $W_{11}$ is modified to a larger extent that $W_{21}$, and new values $W_{12}$ and $W_{22}$ are then utilized to repeat the comparison operation at the sampling point $x_1$ whereupon a new set of modifying factors $W_{13}$ and $W_{23}$ are again obtained. The comparison procedure is repeated in the foregoing manner using each set of newly obtained weighting factors $W_1$ and $W_2$. As the comparison procedure is repeated, the modification necessary for each newly derived set of weighting factors $W_1$ and $W_2$ continuously decreases in the manner of a geometric procession. After a sufficient number of repetitions of the comparison procedure and the attendant modification of each newly derived set of weighting factors, $W_1$ and $W_2$ will converge to the optimum values required by the equation $W_{opt1}\cdot g_1(x)+W_{opt2}\cdot g_2(x)\cong f(x)$.

The convergence of a weighting factor to its optimum value plays a significant role in the perception technique set forth above. However, as the mathematical proof of such convergence is described in detail in the report of Messers. Nagano and Otheru, entitled "Color Mixture Computer Utilizing Learning Machine Techniques," which appears in the Japanese journal "Measurement and Control," Nov. 1967 at pages 782-786, a detailed description of the perception technique will not be here set forth except to briefly note that the essential criteria of optimization through convergence lies in the mode of modification of the weighting factors such that modification at each sampling point is accomplished by modifying in proportion to the values of the individual fundamental waveforms at the respective sampling points. Accordingly, through the use of the foregoing empirical procedure which employs perception techniques, the optimum weighting factors $W_{opt1}$ and $W_{opt2}$ may be obtained and the designated arbitrary waveform $f(x)$ may be synthesized. Therefore, if a general approach is considered, it will be seen that any designated waveform $f(x)$ may be synthesized and thereby analyzed if it is assumed that $n$ fundamental waveforms are present and are sampled at N selected sampling points.

The foregoing empirical techniques have been relied upon in many forms of conventional automatic waveform analyzing apparatus to determine the appropriate weighting factors necessary to synthesize and hence analyze a given arbitrary waveform. The portion of such conventional automatic waveform analyzing apparatus in which the various weighting factors are determined is generally referred to as the variable weighting unit. The variable weighting unit must be capable of storing a value which is representative of the status of each weighting factor prior to the modification thereof, having such value nondestructively read out therefrom and changing the stored value representative of said status in proportion to the modifying signals applied thereto. The variable weighting unit is conventionally formed of a plurality of analog circuit elements wherein each such analog circuit element is associated with one weighting factor. One form of analog circuit element which is often employed in the variable weighting units of automatic waveform analyzing apparatus takes the form of voltage divider means which are controlled by mechanical positioning means. Such voltage divider means may comprise individual potentiometer means whose variable position contact is driven by servomotor means so that the condition of the analog circuit element formed thereby is determined by the position of said contact. Variable weighting units taking this form are advantageous because they exhibit completely nondestructive readout capabilities, are quite accurate over a wide range and may be relied upon to make small final modifications in the value of each weighting factor associated therewith. However, despite such advantages, variable weighting units employing analog circuit elements of this type are not desirable because their mechanically dependent response time is too slow for expeditious use with the complex empirical techniques employed, their reliability is low, manufacturing costs are rather substantial and the resulting structure of the variable weighting unit formed thereby is exceedingly large.

As an alternative form of analog circuit element, magnetic core circuits have been proposed for use in forming the variable weighting unit. Such magnetic core circuits generally take the form of a multiaperture core having independent write and read apertures so that a nondestructive mode of analog operation can be achieved. The multiaperture cores forming each analog circuit element of the variable weighting unit is provided with appropriate write and readout windings so that the flux level of the multiaperture core may be changed in response to weighting factor modifying pulses applied to the write winding thereof while readout pulses applied to the read winding thereof will not substantially alter the flux level of the core as set and periodically modified. Analog circuit elements in the form of magnetic cores such as multiaperture cores possess substantial advantages over analog circuit elements which rely on the position of a movable contact because they rapidly respond to write-in pulses applied thereto to change the flux level therein, are small in size and do not exhibit either the reliability or stability problems associated with variable position contacts present in potentiometer means. However, as shall be seen below, the manner in which magnetic analog memory elements of this type are utilized to form the variable weighting units of automatic waveform analyzing apparatus, causes a plurality of disadvantages to attend their use.

FIG. 2 illustrates conventional waveform analyzing apparatus of the type employing magnetic analog memory elements to form the variable weighting unit thereof. The conventional automatic waveform analyzing apparatus shown in FIG. 2 comprises first and second input information units 1 and 3, scanner means 5, variable weighting unit 7, reference voltage source means 9, summation means 11, polarity detector means 13, gate means 15 and write pulse generator means 17. The first input information unit 1 may take the form of any conventional means wherein $n$ fundamental waveforms $g_1...g_n$ may be sampled at N sampling points $x_1...x_N$ and each sampled value may be set at an initial value proportional to the sampled value. Accordingly, in FIG. 2, the first input information unit 1 is shown as comprising $n$ stages $R_1, R_2...R_n$ associated with each of the fundamental waveforms $g_1(x), g_2(x)...g_n(x)$ and each stage is illustrated as voltage divider means having N presettable taps $x_1, x_2... x_N$ associated respectively with each of the N sampling points $x_1, x_2...x_N$. Thus, it will be appreciated that the first input information unit 1 includes $n$ stages $R_1, R_2...R_n$ arranged in the column direction such that each stage is associated with one of $n$ fundamental waveforms $g_1(x), g_2(x),...g_n(x)$ and each of such $n$ stages $R_1, R_2...R_n$ includes voltage divider means having N presettable taps $x_1, x_2...x_N$ thereon so that N values may be initially set thereon which are respectively proportional to the sampled value of the fundamental waveform associated therewith at each of N sampling points. Each of the $n$ stages $R_1, R_2...R_n$ of the first input information unit 1 is commonly connected through junction J to the output of the gate means 15 and each of such $n$ stages $R_1, R_2...R_n$ is connected through an output conductor $L_1, L_2...L_n$, respectively, to an input of an associated stage of the variable weighting unit 7. The output conductors $L_1, L_2...L_n$ are connected to each of the N presettable taps $x_1, x_2...x_N$ of the stages $R_1, R_2...R_n$ of the first input information unit 1 through switch means, not shown herein, which are selectively actuatable. For instance, such selectively actuatable switch means may comprise bipolar transistor means, pairs of complementary unipolar transistor means, pairs of oppositely directed diodes, controlled rectifier means or any other conventional switching means which may be actuated by a signal applied thereto to selectively apply the signal present at a predetermined one of said presettable taps $x_1, x_2...x_N$ of a given stage $R_1, R_2...R_n$ to the output conductor $L_1, L_2...L_n$ associated with that stage.

A second input to each of the $n$ stages $R_1, R_2...R_n$ of the first input information unit 1 is coupled to the scanner means 5 through the cable 18. The scanner means 5 may take the form of any conventional means capable of sequentially applying actuating pulses to the cable 18 for selectively actuating or enabling each of the switch means interposed between the N presettable taps $x_1...x_N$ present in a given stage $R_1, R_2...R_n$ of the first input information unit 1 and the output conductor associated therewith. Each conductor present in the cable 18 is connected to a commonly located switch means in each of the $n$ stages $R_1, R_2...R_n$ of the first input information unit 1 so that corresponding presettable taps of each stage are simultaneously connected to the output conductor $L_1, L_2...L_n$ associated with that stage. The operation of the scanner means 5 is such that corresponding taps of each stage $R_1, R_2...R_n$ of the first input information unit 1 are sequentially connected to the output conductors $L_1, L_2...L_n$ associated therewith and after the completion of each sequence another sequence is initiated. Thus, it will be appreciated that each tap $x_1...x_N$ of each stage $R_1, R_2...R_n$ is sequentially connected to the output conductor $L_1, L_2...L_n$ associated therewith in a stepwise manner and after each sequence is completed another sequence is begun.

The variable weighting unit 7 comprises $n$ magnetic analog memory elements $A_1, A_2...A_n$ wherein each such magnetic analog memory element is associated with and corresponds to one of the $n$ stages $R_1, R_2...R_n$ of the first input information unit 1 such that corresponding elements are arranged in the row direction. Each of the $n$ magnetic analog memory elements $A_1, A_2...A_n$ is thus associated with a particular one of the $n$ fundamental waveforms $g_1(x), g_2(x)...g_n(x)$ and thereby functions to produce an output signal representative of the weighting factor $W_1, W_2...W_n$ associated with that particular fundamental waveform. The magnetic analog memory elements $A_1, A_2...A_n$ may each take the form of any conventional ferromagnetic device capable of having its flux level discretely varied in response to input pulses applied thereto and producing output pulses, in a nondestructive manner, representative of such flux level. Typically, such magnetic analog memory elements $A_1, A_2...A_n$ may take the form of multiaperture cores having a major or write aperture and a minor aperture utilized for readout so that learning techniques may be employed. In the conventional automatic waveform analyzing apparatus shown in FIG. 2, each magnetic analog memory element $A_1, A_2...A_n$ should be considered to be a multiaperture core whose major aperture is wound by the conductor $L_1, L_2...L_n$ associated with that magnetic analog memory element and whose minor aperture is wound by an output conductor $0_1, 0_2...0_n$ associated therewith. The precise structure of each magnetic analog memory element $A_1, A_2...A_n$ will be described in detail in conjunction with FIG. 4; however, it is here sufficient to appreciate that each magnetic analog memory element $A_1, A_2...A_n$ receives a write in pulse from the conductor $L_1, L_2...L_n$ associated therewith whose magnitude is dependent upon the corresponding sampling point $x_1, x_2...x_N$ and fundamental waveform $g_1(x), g_2(x)...g_n(x)$ and in response to such write-in pulses the flux level of such magnetic analog memory element will be changed. In addition, upon the application of read pulses thereto, each magnetic analog memory element $A_1, A_2...A_n$ will produce readout pulses representative of such flux level and hence the weighting factor $W_1, W_2...W_n$ associated with such fundamental waveform $g_1(x), g_2(x)...g_n(x)$. The output conductors $0_1, 0_2...0_n$ are each connected to a corresponding stage of the second input information unit 3. Each of the output conductors $0_1, 0_2...0_n$ are provided with output terminal means $Out_1, Out_2...Out_n$, respectively, so that signals present thereon, representing as aforesaid, the weighting factors $W_1, W_2...W_n$ associated with each fundamental waveform $g_1(x), g_2(x)...g_n(x)$ may be indicated.

The second input information unit 3 may, like the first input information unit 1, take the form of any conventional means wherein $n$ fundamental waveforms $g_1, g_2...g_n$ may be sampled at N sampling points $x_1, x_2...x_N$ and each sampled value may be set as an initial value proportional to the sampled value. Therefore, in FIG. 2, the second input information unit 3, like the first input information unit 1, is shown as comprising a stage $R_1', R_2'...R_n'$ associated with each of the $n$ fundamental waveforms $g_1(x), g_2(x)...g_n(x)$ and each stage includes voltage divider means having N presettable taps $x_1, x_2...x_N$ associated, respectively, with each of N sampling points $x_1, x_2...x_N$. Thus, the above-described portion of the second input information unit 3 is shown as virtually identical to the first input information unit 1 including $n$ stages $R_1, R_2...R_n$ arranged in the column direction such that each of such $n$ stages is associated with one of the $n$ fundamental waveforms $g_1(x), g_2(x)...g_n(x)$ and each of such $n$ stages $R_1', R_2'...R_n'$ includes voltage divider means having N presettable taps $x_1, x_2...x_N$ thereon so that N values may be initially set which values are proportional to the sampled value of the fundamental waveform associated therewith at each of N sampling points. Furthermore, each stage $R_1', R_2'...R_n'$ of the second input information unit 3 is associated with the same fundamental waveform as the corresponding stage $R_1, R_2...R_n$ of the first input information unit 1 so that each row formed by the individual portions of the first input information unit 1, the variable weighting unit 7 and the second input information unit 3 is associated with the same fundamental waveform $g_1(x), g_2(x)...g_n(x)$. The second input information unit 3 also includes an additional stage $R_s'$ which is associated with the desired arbitrary waveform $f(x)$ to be analyzed. The stage $R_s'$ takes the same form as each of the other $n$ stages $R_1', R_2'...R_n'$ present in the second input information unit 3 and is adapted to have N values set therein which are proportional to the sampled values of the arbitrary waveform $f(x)$ sampled at N preselected sampling points. The $n$ stages $R_1', R_2'R_n'$ of the second input information unit 3 associated with the $n$ fundamental waveforms $g_1(x), g_2(x)...$ $g_n(x)$ are connected at first input means therefor to output conductors $0_1, 0_2...0_n$, respectively, from the variable weighting unit 7 while stage $R_s'$ is connected at a first input means therefor to the output of the reference voltage source means 9. The reference voltage source means 9 may take the form of any conventional generator means capable of applying a voltage to the stage $R_s'$ of the second input information unit 3 which is of an appropriate magnitude for division thereby into the requisite voltage magnitudes proportional to the values of the arbitrary waveform $f(x)$ as sampled at the N sampling points represented by the taps $x_1, x_2...x_N$ of stage $R_s'$. The output of each stage $R_1', R_2'...R_n'$ and $R_s'$ of the second input information unit 3 is connected through an associated conductor $L_1', L_2'...L_n'$ and $L_s'$, respectively, to a corresponding input of the summation means 11. The conductors $L_1', L_2'...L_n'$ and $L_s'$ are connected to each of the presettable taps $x_1, x_2...x_N$ of the stage associated therewith through a plurality of selectively actuatable switch means, not shown herein, in the same manner as was specified for the connection of each stage $R_1, R_2...R_n$ of the first input information unit 1 to the conductors $L_1, L_2...L_n$ associated therewith. Each stage $R_1', R_2'...R_n'$ and $R_s'$ of the second input information unit 3 is commonly connected to the scanner means 5 through the cable 18 so that each of the commonly located switch means therein may be selectively actuated by said scanner means 5 in the manner described above with regard to the first input information unit 1.

The summation means 11 may take the form of conventional adder means which acts in the well known manner to algebraically sum each of the input signals applied thereto and produce an output signal representative thereof. As indicated by the plus (+) and minus (−) signs associated with the various inputs to the summation means 11, the inputs applied thereto by the conductors $L_1', L_2'...L_n'$ and associated with each fundamental waveform $g_1(x), g_2(x)...g_n(x)$ are applied having a first polarity while the input applied thereto by the conductor $L_s'$ and associated with the designated, arbitrary waveform $f(x)$ is applied having a second polarity. As will be appreciated by those of ordinary skill in the art, the polarity inversion which accompanies the application of the signal on conductor $L_s'$ to the summation means 11, may be accomplished by reversely connecting conductor $L_s'$ with respect to the conductors $L_1', L_2'...L_n'$, by applying such signal through means for introducing a phase inversion of one hundred eighty degrees (180°) thereinto or by selecting a reference voltage source 9 which produces a negative voltage. The output of the summation means 11 thus represents the sum at a given instant of signals present on conductors $L_1', L_2'...L_n'$ which are associated, as aforesaid, with the fundamental waveforms $g_1(x), g_2(x)...g_n(x)$ minus the signal present on the conductor $L_s'$ at such instant which is representative of the designated, arbitrary waveform $f(x)$.

The output of the summation means 11 is connected to an input of the polarity detector means 13 through the conductor 19. The polarity detector means 13 may take the form of any conventional means, such as a polarity discriminator, capable of detecting the polarity of input signals applied thereto and producing an output signal representative thereof. The output of the polarity detector means 13 is connected through the conductor 21 to a switching input of the gate means 15. The gate means 15 may comprise conventional gating circuitry which acts in the well-known manner to apply first or second polarity pulses to the output thereof in response to the nature of the input signals received at the switching input thereto. In the conventional automatic waveform analyzing apparatus shown in FIG. 2, the gate means 15 should be considered as applying signals having a first polarity to the output thereof when the signal applied to the switching input thereof by the polarity detector means 21 represents one polarity and signals having a second polarity to the output thereof when the signals applied thereto by said polarity detector means 13 are representative of another polarity. The gate means 15 is also connected at the signal input thereto to the write pulse generator means 17. The write pulse generator means 17 may take the form of a conventional core drive source which acts in the conventional manner to apply write pulses to the signal input of the gate means 15 for application to the output thereof. As is well known, the write pulse generator means 17 may comprise constant pulse source means, stabilized voltage source means, stabilized current source means or other well known core driver circuits. The output of the gate means 15 is connected to the junction point J and hence to the inputs of each stage $R_1, R_2...R_n$ of the first input information unit 1 as aforesaid.

The operation of the conventional automatic waveform analyzing apparatus shown in FIG. 2 will be described in conjunction with FIGS. 3A–3D. FIGS. 3A–3D show waveforms which are illustrative of the waveform synthesis technique employed in the conventional automatic waveform analyzing apparatus depicted in FIG. 2 wherein FIGS. 3A–3C show the waveforms of the fundamental waveforms $g_1(x), g_2(x)...g_n(x)$ relied upon while FIG. 3D illustrates the waveform of the desired arbitrary waveform $f(x)$. In FIGS. 3A–3D, the ordinate of each curve is representative of the magnitude of the waveform while the sampling distance $x$ is indicated along the abscissa. Additionally, in FIGS. 3A–3D the selected sampling points $x_1, x_2...x_N$ are indicated at corresponding positions along the abscissa of the waveform by dashed lines and reference characters.

In the operation of the conventional automatic waveform analyzing apparatus shown in FIG. 2, the sampling values for each of the fundamental waveforms $g_1(x), g_2(x)...g_n(x)$ are initially set at each of the plurality of presettable taps $x_1, x_2...x_N$ of each of the stages $R_1, R_2...R_n$ and $R_1', R_2'...R_n'$ of the first and second input information units 1 and 3. In addition, the stage $R_2'$ of the second input information unit 3 has each of the presettable taps $x_1, x_2...x_N$ set at representative sampling values for the designated arbitrary waveform $f(x)$. The manner in which the resistance values corresponding to values proportional to the sampling values of each of the fundamental waveforms $g_1(x), g_2(x)...g_n(x)$ and the sampling values of the designated arbitrary waveform $f(x)$, at each sampling point $x_1, x_2...x_N$, is calculated is a complex procedure which is well known to those of ordinary skill in the art. Accordingly, this mode of calculation will here be omitted in the interest of simplicity, it being understood that resistance values proportional to the sampling values indicated in FIGS. 3A–3D are calculated, i.e., $g_1(x_1)−g_1(x_N)$, $g_2(x_1)−g_2(x_N)...g_n(x_1)−g_n(x_N)$ and $f(x_1)AY1f(x_N)$, and such values are preset at the appropriate presettable taps $x_1, x_2...x_N$ therefor in the first and second input information units 1 and 3. Thus, prior to the operation of the conventional automatic waveform analyzing apparatus shown in FIG. 2, the presettable taps $x_1, x_2...x_N$ present in stages $R_1$ and $R_1'$ of the first and second input information units 1 and 3 are preset to values which are proportional to the values of the fundamental waveform $g_2(x)$ at the sampling points $x_1, x_2...x_N$ as shown in FIG. 3A. The presettable taps $x_1, x_2...x_N$ present in the stages $R_2$ and $R_2'$ of the first and second input information units 1 and 3 are preset to values which are proportional to the values of the fundamental waveform $g_2(x)$ at the sampling points $x_1, x_2...x_N$ as shown in FIG. 3B. And this procedure is repeated until the presettable taps $x_1, x_2...x_N$ present in the stages $R_n$ and $R_n'$ of the first and second input information units 1 and 3 are preset to values which are proportional to the values of the fundamental waveform $g_n(x)$ at the sampling points $x_1, x_2...x_N$ as shown in FIG. 3C. Additionally, the presettable taps $x_1, x_2...x_N$ present in the stage $R_s'$ of the second input information unit 3 are preset to values which are proportional to the values of the designated, arbitrary waveform $f(x)$ at sampling points $x_1, x_2...x_N$ as shown in FIG. 3D.

Upon the completion of the foregoing calibration procedure, the initiation of the actual operation of the conventional automatic waveform analyzing apparatus may commence. The explanation of the operation of the conventional automatic waveform analyzing apparatus shown in FIG. 2 will proceed upon the initial assumption that when such automatic waveform analyzing apparatus is energized the scanner means 5 will be in a condition such that the presettable tap $x_1$ in each stage of the first and second input information units 1 and 3 is effectively connected through enabled switch means to the conductors $L_1$, $L_2...L_n$, $L_1'$, $L_2'...L_n'$ and $L_s'$ associated therewith, while each of the other presettable taps $x_2...x_N$ are not effectively connected thereto as their associated switch means are not enabled. When the conventional automatic waveform analyzing apparatus depicted in FIG. 2 is energized, read pulses will be applied to each of the magnetic analog memory elements $A_1$, $A_2...A_n$ present in the variable weighting unit 7. The manner in which such read pulses are applied to each of the magnetic analog memory elements $A_1$, $A_2...A_n$ will be explained in detail in conjunction with FIG. 4; however, at this point in the description of FIG. 2 it is sufficient to appreciate that each of said magnetic analog memory elements $A_1$, $A_2...A_n$ includes, as aforesaid, a multiaperture core having both a major write aperture and a minor read aperture and that upon the application of a read pulse to the minor aperture thereof, a readout pulse will be produced in the well-known manner whose magnitude is representative of the flux level then present in such multiaperture core. Furthermore, as is well known to those of ordinary skill in the art, the application of read pulses to the minor aperture of the multiaperture core, will not substantially change the flux level previously set in said multiaperture core. For the purposes of the description of the operation of the conventional automatic waveform analyzing apparatus shown in FIG. 2, each of the multiaperture cores present in the variable weighting unit 7 may be assumed to be in a blocked flux state. Accordingly, when read pulses are applied to each of the magnetic analog memory elements $A_1$, $A_2...A_n$, the multiaperture core present in each of said magnetic analog memory elements $A_1$, $A_2...A_n$ will produce a readout pulse, representative of the flux state thereof, and said readout pulse will be coupled to the output conductor means $0_1$, $0_2...0_n$ in the well-known manner. The readout pulses applied by the magnetic analog memory elements $A_1$, $A_2...A_n$ to the output conductor means $0_1$, $0_2...0_n$, respectively, are coupled thereby to the stages $R_1'$, $R_2'$ and $R_n'$ of the second input information unit 3 associated therewith and are also available at the outputs $Out_1$, $Out_2...Out_n$ of the variable weighting unit 7 associated therewith. As only the presettable tap $x_1$ of each of the stages $R_1'$, $R_2'...R_n'$ is operably connected to the conductor $L_1'$, $L_2'...L_n'$ of the stage associated therewith, the readout pulses applied to each stage $R_1'$, $R_2'...R_n'$ of the second input information unit 3 will be attenuated to a degree dictated by the setting of the tap $x_1$ associated with that stage, in the well known manner, and applied to the conductor $L_1'$, $L_2'...L_n'$ associated with that stage. The pulses thus present on the conductors $L_1'$, $L_2'...L_n'$ thereby represent the level of the multiaperture core in the magnetic analog memory element $A_1$, $A_2...A_n$ in the row associated therewith as suitably attenuated, in a manner which is proportional to the initially set value of the fundamental waveform $g_1(x)$, $g_2(x)...g_n(x)$ associated with that row at the sampling point $x_1$, by the voltage divider setting of each stage as formed by the initial setting of the presettable tap $x_1$ as aforesaid.

In a similar manner, when such readout pulses are applied to stages $R_1'$, $R_2'...R_n'$ of the second input information unit 3, the voltage reference source means 9 will apply a reference pulse to the stage $R_s'$ of the second input information unit 3. The pulse applied to stage $R_s'$ is suitably attenuated by the setting of the presettable tap $x_1$ in stage $R_s'$ so that the magnitude of the pulse as applied to the conductor $L_s'$ is proportional to the magnitude of the designated arbitrary waveform $f(x)$ at sampling point $x_1$ as indicated in FIG. 3D. Accordingly, it will be appreciated that each conductor $L_1'$, $L_2'...L_n'$ has a pulse thereon during this interval which represents the flux state of the multiaperture core in the magnetic analog memory element $A_1$, $A_2...A_n$ associated therewith as suitably attenuated by the tap setting $x_1$ in the stage $R_1'$, $R_2'...R_n'$ associated therewith while the conductor $L_s'$ has a pulse thereon whose value is proportional to the value of the designated arbitrary waveform $f(x)$ at the sampling point $x_1$. The pulses present on the conductors $L_1'$, $L_2'...L_n'$ and $L_s'$ are each applied to their respective inputs of the summing means 11 with the pulses present on conductor $L_s'$ being inverted, as aforesaid, by one hundred eighty degrees (180°). The summing means 11 acts in the well-known manner on each of the input pulses received thereby to algebraically add such input pulses and produce an output signal representative of the sum thereof. Under the conditions presently being discussed, it will be seen that since the input pulse present on conductor $L_s'$ is inverted with respect to each of the other input pulses applied, the output pulse produced by said summing means is representative of a value equal to the expression $W_{10}\cdot g_1(x_1) + W_{20}(x_1)...+W_{n0}g_n(x_1) - (x_1)$. The output of the summing means 11, which may take the form of a pulse whose magnitude and polarity are representative of the result of the foregoing summation process, is applied to the input of the polarity detector means 13 through the conductor 19.

The polarity detector means 13 acts in the conventional manner to discriminate the input pulse received thereby as to polarity and to produce an output representative of the polarity of the input signal received. If it is assumed that each of the multiaperture cores present in the variable weighting unit 7 was initially in its blocked state, it will be appreciated that the pulses read out therefrom will be large and hence the sum of the pulses present on the conductors $L_1'$, $L_2'...L_n'$ will here exceed the pulse present on the conductor $L_s'$ whereby the output of the summing means 11 will be of a positive polarity. Under these conditions, the polarity detector means 13 will produce an output signal representative of the presence of a positive polarity input signal and such output signal will be applied to the switching input of the gate means 15.

The gate means 15 acts in the well-known manner to apply either a positive or negative write-in pulse from the write pulse generator means 17 to the junction point J in response to each input signal received at the switching input thereof from the polarity detector means 13. Therefore, under the conditions mentioned above, wherein the polarity detector means 13 generates a signal indicating that the output of the summing means 11 is of a positive polarity, the gate means 15 will be enabled in a manner such that a positive polarity write-in pulse is applied therethrough to the junction point J. As the junction point J is connected, as aforesaid, to the first input of each stage $R_1$, $R_2...R_n$ of the first input information unit 1, each such stage $R_1$, $R_2...R_n$ will receive the input pulse applied to the junction point J by the gate means 15. As the scanner means 5 has, as aforesaid, connected the presettable tap $x_1$ of each stage $R_1$, $R_2...R_n$ to the conductor means $L_1$, $L_2...L_n$, associated therewith, the magnitude of the write-in pulse applied to the input of each stage $R_1$, $R_2...R_n$ will be selectively attenuated at each each such stage by an amount proportional to the value of the fundamental waveform $g_1(x_1)$, $g_2(x_1)...g_n(x_1)$ at the sampling point $x_1$, as shown in FIGS. 3A-3C, as determined by the initial setting of the presettable tap $x_1$. Accordingly, each of the conductors $L_1$, $L_2...L_n$ receives a write-in pulse whose magnitude is determined by the position of the presettable tap $x_1$ of the stage $R_1$, $R_2...R_n$ associated therewith.

As the conductors $L_1$, $L_2...L_n$ are connected to the write inputs of the magnetic analog memory elements $A_1$, $A_2...A_n$, respectively, and more particularly are wound about the major or write apertures of the multiaperture cores present therein, the write-in pulses present on the conductors $L_1$, $L_2...L_n$ are applied as write-in pulses to the major apertures of the multiaperture cores present in the magnetic analog memory elements $A_1$, $A_2...A_n$, respectively. The multiaperture core present in each magnetic analog memory element $A_1$, $A_2...A_n$ will have its flux level changed, in the well known manner, in response to the write-in pulse applied thereto and, as is explained below, the degree of such flux level change will depend upon the magnitude and duration of the write-in pulse received as well as other factors set forth below. Accordingly, when the multiaperture cores are subsequently read out, the magnitude of each readout pulse obtained will reflect the new flux level of the multiaperture core thus read. Therefore, it will be appreciated that after the completion of the first cycle of operation of the conventional automatic waveform analyzing apparatus shown in FIG. 2, each of the magnetic analog memory elements $A_1$, $A_2...A_n$ will produce a readout pulse whose magnitude is representative of the flux level of the multiaperture core associated therewith and the flux level of each multiaperture core will depend upon the magnitude of the write-in pulse received thereby as well as the past history thereof.

Upon the completion of the first cycle of operation of the automatic waveform analyzing apparatus, as set forth above, the scanner means 5 will step the signals applied thereby to cable 18 so that the connection of the presettable tap $x_1$ of each stage $R_1-R_n$, $R_1'-R_n'$ and $R_s'$ of the first and second input information units 1 and 3 to the conductors $L_1-L_n$, $L_1'-L_n'$ and $L_s'$ associated, respectively, therewith by the switch means therefor is disabled and the switch means associated with each presettable tap $x_2$ in each of said stages $R_1-R_n$, $R_1'-R_n'$ and $R_s'$ is enabled. Thereafter, each of the magnetic analog memory elements $A_1-A_n$ present in the variable weighting unit 3 is again read in a nondestructive manner so that a new output pulse is derived from the output of the summing means 11 which is again relied upon to cause a properly directed write-in pulse to be applied to each analog storage element $A_1-A_n$ of the variable weighting unit 7 to change the respective flux levels thereof after such write-in pulse has been appropriately adjusted as to magnitude by the requisite stages $R_1-R_n$ of the first input information unit 1. Thus, each magnetic analog memory element $A_1-A_n$ in the variable weighting unit 7 has the flux level of the multiaperture core associated therewith again modified by the write-in pulses applied thereto when the presettable taps $x_2$ are utilized and hence the readout pulses produced by the magnetic analog memory element $A_1-A_n$ are further modified to reflect the newly set flux levels of the multiaperture cores present therein. Upon the completion of the second cycle of operation of the conventional waveform analyzing apparatus shown in FIG. 2, further cycles of operation are initiated until each of the presettable taps $x_1-x_N$ present in each of the stages $R_1-R_n$, $R_1'-R_n'$ and $R_s'$ have been sequentially connected to the conductors $L_1-L_n$, $L_1'-L_n'$ and $L_s'$ associated with the stage in which they reside. Thereafter, the scanner means 5 again enables all of the switch means associated with the presettable taps $x_1$ and the sequential connection is again stepped through each of the presettable taps $x_1-x_N$ so that additional sets of N cycles of operation are obtained.

As will be appreciated by those of ordinary skill in the art, the function of the first input information unit 1 is to ensure that the modification of the flux level in the multiaperture core present in each of the magnetic analog memory elements $A_1$, $A_2...A_n$ is accomplished in proportion to the values of the individual fundamental waveforms $g_1(x)$, $g_2(x)...g_n(x)$ in accordance with known perception convergence techniques. This function is achieved by modifying the amplitude of each write-in pulse applied to the magnetic analog memory elements $A_1$, $A_2...A_n$ by the voltage dividing arrangements present in each stage $R_1$, $R_2...R_n$ of the first input information unit 1 as initially established by the calibration procedure involving the initial setting of the presettable taps $x_1-x_N$ present in each of stages $R_1-R_n$. Therefore, as each cycle of operation of the conventional waveform analyzing apparatus shown in FIG. 2 is repeated, the flux level of the multiaperture cores and hence the readout pulses produced by the magnetic analog memory elements $A_1-A_n$ will converge toward an optimum value while the output pulses produced by the summing means 11 will gradually approach zero. When the output of the summing means 11 approaches a zero magnitude by a sufficiently close degree, the learning process wherein pulses of varying magnitudes are applied to each multiaperture core to achieve an optimum flux level therein each time an output pulse is produced by the summing means 11 will cease as polarity indicative signals are no longer applied to the switching input of gate means 15 by the polarity detector means 13. Thereafter, when read pulses are applied to the multiaperture cores in each of the magnetic analog elements $A_1-A_n$. The optimized value of the pulses read out from each magnetic analog storage element $A_1-A_n$ may be obtained from the output terminal means $Out_1$, $Out_2...Out_n$. The optimized weighting factors $W_{opt1}$, $W_{opt2}...W_{optn}$, which are proportional to the values of the pulses read out from the magnetic analog elements $A_1$, $A_2...A_n$, may thus be obtained and the analysis of the designated arbitrary waveform $f(x)$ completed.

Although the application of write-in pulses to each multiaperture core in the variable weighting unit 7 through the first input information unit 1 causes the amplitude of each write-in pulse applied to a given multiaperture core to vary in accordance with the value of the fundamental waveform $g_1(x)$, $g_2(x)...g_n(x)$ associated with that core at each of the sampling points selected to thereby achieve convergence of the flux level in each such multiaperture core to an optimum value by known perception techniques, this mode of operation is not highly successful because in practical embodiments of the conventional automatic waveform analyzing apparatus shown in FIG. 2 it has been found that the range of modification available for flux level adjustment is too limited for the analysis performed to exhibit high accuracy. This occurs, as shall be seen below, because the hysteresis characteristics of actual multiaperture cores are not rectangular and hence the read operation performed is not sufficiently nondestructive to allow fine adjustments in the flux level in each multiaperture core to be achieved over more than a limited range of operation. Furthermore, the calibration which must be carried out at each multiaperture core to establish desire characteristics therefor is highly complex and the simultaneous operation of a plurality of multiaperture cores at different flux levels acts to further limit the range of operation of each multiaperture core in such plurality.

To perform a learning operation wherein each multiaperture core in the variable weighting unit 7 receives a write-in pulse to modify the flux level therein for each output pulse produced by the summing means 11, it will be appreciated that such variable weighting unit must exhibit (1) short write and read times as well as highly stable memory characteristics and (2) a large number of discrete, selectable flux levels or quantized analog flux levels so as to allow highly precise adjustments in the weighting factors $W_1$, $W_2...W_n$ to be made. Generally, conventional automatic waveform analyzing apparatus such as that shown in FIG. 2 clearly satisfies the conditions required by (1) because these characteristics are normally inherent in multiaperture cores. However, the conditions specified in (2) as directed to a large number of discrete, selectable flux levels will not obtain in such conventional automatic waveform analyzing apparatus because of the actual, nonideal hysteresis characteristics of multiaperture cores and the mode of operation utilized by conventional automatic waveform analyzing apparatus wherein each multiaperture core therein receives a variable amplitude write-in pulse for each output pulse produced by the summing means 11.

The manner in which nonideal hysteresis characteristics of multiaperture cores coupled with the perception techniques employed in conventional automatic waveform analyzing apparatus, as exemplified by FIG. 2, adversely affects the operation of such conventional automatic waveform analyzing apparatus will be more clearly understood in conjunction with FIGS. 4-6. FIG. 4 shows a magnetic analog memory element, employing a multiaperture core, commonly relied upon in conventional automatic waveform analyzing apparatus. The multiaperture core is conventionally relied upon to form magnetic analog memory elements because the structure thereof allows the write-in path to be substantially different from the readout path and hence a magnetic flux level may be set within a certain range therein and retained to a substantial degree despite repeated readout operations. Furthermore, the magnetic flux level may be arbitrarily changed at the write aperture to thereby change the magnitude of the readout pulse produced and hence the value relied upon to represent the weighting factor, i.e., $W_1$, $W_2...W_n$. The magnetic analog memory element shown in FIG. 4 comprises a multiaperture core 20 having major and minor apertures 22 and 24 therein. The major aperture 22 is wound by an $N_w$ turn write winding 26 while the minor aperture 24 is wound in a first direction by a read winding 28 and in a second direction by a read winding 30. The write winding 26 is adapted to be connected to a source of write-in pulses, not shown, which in the case of the conventional automatic waveform analyzing apparatus illustrated in FIG. 2 would be derived from one of the lines $L_1$, $L_2...L_n$ while each of the read windings 28 and 30 is adapted to be driven by positive polarity pulses applied thereto through the diodes $D_2$ and $D_1$, respectively, from the center tapped secondary winding of a transformer means T. The opposite sides of the read windings 28 and 30 are commonly connected, as shown in FIG. 4, to the junction 32. A load $R_L$ is interposed between the common junction 32 of the read windings 28 and 30 and the center tapped portion of the secondary winding of the transformer means T through the conductor 34.

The operation of the magnetic analog memory element shown in FIG. 4 will be explained in conjunction with FIGS. 5 and 6 wherein FIG. 5 illustrates the voltage output characteristics of the magnetic memory element shown in FIG. 4 as a function of the number of input pulses received thereby and FIG. 6 illustrates the hysteresis characteristics about the major aperture of the magnetic analog memory element of FIG. 4. In the operation of the magnetic analog memory element shown in FIG. 4, it should be initially assumed that the multiaperture core is in the blocked state as indicted at the lower remanent position of the hysteresis loop shown in FIG. 6. This may be initially accomplished by applying a large magnitude setting pulse to the write winding 26 in an opposite direction or at an opposite polarity to the write-in pulses which are subsequently applied thereto. Thereafter, write-in pulses may be applied to the write winding 26 which act to change the flux level established in the multiaperture core 20 from the blocked state indicated as the lower remanent point in FIG. 6 to various other points on the hysteresis loop, away from such lower remanent point, due to the minor loop operation which takes place, in the well-known manner, in response to each such write-in pulse. Furthermore, oppositely directed write-in pulses will drive the multiaperture core toward its lower remanent point in the well known manner. Thus, the flux level of the multiaperture core 20 depicted in FIG. 4 will be a function of the number of write-in pulses applied to the write winding 26 and the nature of the minor loop excursions induced by such write-in pulses. If the flux level established in the multiaperture core 20 when in the blocked state is considered as indicated by $\Phi_w$, it will be appreciated that this flux level will be maintained by the hysteresis characteristics thereof and will exert a DC magnetizing force on the minor aperture 24. Therefore, when read pulses are applied to the minor aperture 24 by the secondary winding of the transformer means T, the diodes $D_1$ and $D_2$ and the read windings 28 and 30; the current applied to the load $R_L$ will be maximized and hence the voltage $V_o$ thereacross will also be maximized. Thereafter, as the flux level in the multiaperture core 20 is gradually reversed, by the write-in pulses applied to the write winding 26, the inductance exhibited by the minor aperture 24 will increase whereupon with subsequent read cycles, the current applied to the load $R_L$ will decrease as will the voltage $V_o$ thereacross. Accordingly, within a limited range of operation, the voltage output characteristic of the magnetic analog memory element shown in FIG. 3 will be a function of the flux level of the multiaperture core 20 as determined by the number of write-in pulses applied thereto. The read windings 28 and 30 are wound in opposite directions through the minor aperture 24 and both receive positive polarity pulses in an alternating sequence to insure that reversible switching about the minor aperture 24 takes place; however, as shall be seen below, the read operation is not entirely nondestructive as regards the flux level established in the multiaperture core 20.

The output characteristics of the magnetic analog memory element 20 shown in FIG. 4 are indicated by the plot of output voltage $V_o$ versus the number of write-in pulses illustrated in FIG. 5. In FIG. 5, the output $V_o$ is plotted as the ordinate while the number of input pulses has been indicated along the abscissa. The curves in FIG. 5 were plotted wherein constant amplitude write-in pulses having a magnitude of 0.7 v. and a width of 50 $\mu$s. were applied to the write winding 26 in FIG. 4. The solid curve 36 in FIG. 5 indicates the output voltage $V_o$ versus the number of input pulses $n$ applied when the multiaperture core is initially placed in the blocked state and write-in pulses $n$ are applied thereto so as to gradually reverse this flux state until point $b$ on the curve 36 is reached. The dashed curve 38 in FIG. 5 indicates the relationship which obtains when the multiaperture core 20 is in the condition indicated by point $b$ and oppositely directed write-in pulses are applied to the write-in winding 26 to gradually drive the multiaperture core 20 toward the blocked state. It will be appreciated from an inspection of the plot in FIG. 5 that the curves 36 and 38 are not coterminous, that they are not linear and that the usable operating range of the magnetic analog memory element 20 is limited to the portions of the curves residing between points $a$ and $b$ wherein point $a$ indicates a remanent position on the hysteresis loop and point $b$ indicates the maximum displacement from such remanent point after which the variation in the output voltage $V_o$ decreases rapidly. From the standpoint of operation as a magnetic analog memory element $A_1-A_n$, it would be desirable if the curves 36 and 38 shown in FIG. 5 were linear and coterminous as this would enable the reversible operation of each such magnetic analog storage element $A_1-A_n$. Furthermore, it is desirable that the number of write-in pulses $n_{max}$ necessary to drive the multiaperture core 20 from point $a$ to point $b$ in FIG. 5 be as large as possible so that the value of the weighting factor values $W_1-W_n$ derived therefrom may be made to closely approach the optimum values required to an extremely close degree by allowing many adjustments thereof. In FIG. 5, using write-in pulses having an amplitude of 0.7 v. and a duration of 50 $\mu$s. the value of $n_{max}$ required to reach point $b$ was 40; thus, although it is possible to increase this value by using write-in pulses having a smaller value, point $b$ cannot be actually extended due to the magnetic characteristics of the multiaperture core which causes the variation in the output voltage $V_o$ to rapidly decrease despite the voltage time integration value of the pulses used to drive the multiaperture core 20 toward point $b$. Point $b$ is present on the curves 36 and 38 of FIG. 5 because a reversible magnetic flux component is produced in the magnetic analog memory element due to the destruction of write-in flux during the readout operation and such reversible magnetic flux component is increased as the level of flux of the multiaperture core is driven away from the blocked state.

The characteristic form of curves 36 and 38 shown in FIG. 5 may be explained in conjunction with the hysteresis loop of FIG. 6 which illustrates the magnetization characteristic for the ferromagnetic material about the major aperture 22 of the multiaperture core 20 and illustrates the problems associated therewith when an ideal, nonrectangular hysteresis loop is unavailable as is always the case in practice. For example, when the write-in value $\Phi_w$ is small and the flux level of the multiaperture core 20 is not distant from the blocked state, i.e., the lower remanent position, the state of magnetization will change due to a write-in pulse along the minor loop indicated by points $a$, $b$, $c$ and $d$. Under these conditions, the change in flux value $\Phi_w$ due to the write-in pulse as indicated between points $a$ and $d$ is nearly equal to the maximum flux variation $\Phi T$ which is proportional to the voltage time integration value of the write-in pulse. As a result, the change in voltage indicated in FIG. 5 will vary at a large slope and hence the change in the output voltage $V_o$ due to one of the initial write-in pulses will be substantial. However, after a significant number of write-in pulses or several large write-in pulses, the reversible flux will substantially increase so that upon the application of the next write-in pulse, the state of magnetization will change along the minor loop indicated by points $a'$, $b'$, $c'$ and $d'$. If for this minor loop, i.e., $a'$, $b'$, $c'$ and $d'$, the maximum flux variation $\Phi T$ is considered as unchanged, the write-in value $\Phi'_w$ becomes substantially smaller than the previous write-in value $\Phi_w$. As shown in FIG. 5, operation at this portion of the hysteresis loop results in a smaller output voltage $V_o$ variation as indicated by the smaller slope of the portion of curves 36 and 38. These characteristics are akin to the operation of a reciprocal piston pump system where, as the tank becomes increasingly filled with air, the amount of air introduced into the tank with each stroke of the piston is reduced. Thus, it will be appreciated from FIGS. 5 and 6 that as the number of write-in pulses applied to the multiaperture core 20 in FIG. 4 causes the flux level thereof to approach the flux level associated with the number of write-in pulses indicated at point $b$ in FIG. 5, the change in the value of the readout pulses will be markedly decreased until no significant change can be obtained upon the application of further write-in pulses. Furthermore, as the curves 36 and 38 in FIG. 5 are not linear, the change in the output voltage of a readout pulse will not be a linear function and is highly dependent on the previous flux state of the multiaperture core 20.

If the operation of the automatic waveform analyzing apparatus shown in FIG. 2 is considered, it will be recalled that each magnetic analog memory element $A_1$–$A_n$ is associated with each fundamental waveform $g_1(x)...g_n(x)$ and hence receives an input pulse for each cycle of operation where an output pulse is produced by the summing means 11. This form of operation is not advantageous because since each magnetic analog memory element $A_1$–$A_n$ receives a write-in pulse for each cycle of operation, the available range of operation of such magnetic analog memory elements $A_1$–$A_n$, as indicated in FIG. 5 between points $a$ and $b$, is quickly exhausted by the first multiaperture core to reach point $b$. Therefore, final modifications in the flux level of each magnetic analog memory element, and hence the output voltage $V_o$ of the readout pulses produced thereby, cannot be achieved after the first multiaperture core of the group has reached point $b$, and thus optimized weighting factor values which are finely adjusted cannot be obtained. Furthermore, as the write-in pulses applied to each magnetic analog memory element $A_1$–$A_n$ are obtained from the various voltage dividing networks in the $n$ stages $R_1$–$R_n$ of the first input information unit 1, the magnitudes of the write-in pulses will clearly differ whereby some of the multiaperture cores present in the variable weighting unit 7 will be quickly driven toward point $b$ on their characteristics to thereby quickly exhaust the available operating range of the variable weighting unit 7. In addition, each write-in pulse may produce a different effect in the value $V_o$ of a readout pulse, which is not related to the value of a fundamental waveform $g_1(x)A$–$g_n(x)$ at a given sampling point $x_1$–$x_N$ whereby convergence will be difficult to obtain and the initial calibration will be quite complex.

As has been described, it is difficult to read the contents of a magnetic analog memory element of the foregoing variety in an entirely nondestructive manner and the operating range of such elements is highly limited. Therefore, when magnetic analog memory elements including multiaperture cores are relied upon in conventional automatic waveform analyzing apparatus such as that shown in FIG. 2, it is not generally possible to achieve fine modifications in the values of the weighting factors obtained and to thereby achieve high calculating accuracy. Furthermore, in conventional automatic waveform analyzing apparatus, the ratio of the modifying value of each weighting factor $W_1$–$W_n$ at each sampling point is obtained by the voltage division of the input pulse applied to the magnetic analog memory element and it is necessary to change the input signal of the magnetic analog memory element at each sampling point. Thus, each such magnetic memory element requires complex calibration and it is not generally desirable to perform the modification for the sampling point value of a fundamental waveform at the input to the magnetic analog memory element because, as seen in conjunction with FIGS. 5 and 6, the output of a multiaperture element will not vary in proportion to the value of the write-in or input pulse. Thus, conventional automatic waveform analyzing apparatus does not operate in a manner calculated to achieve highly accurate results.

The present invention proceeds upon a recognition of these difficulties and upon the discovery that if each magnetic analog memory element is associated with a given sampling point $x_1$, $x_2...x_N$, as distinguished from a given fundamental waveform $g_1(x)$–$g_n(x)$, the erroneous effects of the limited range of operation of multiaperture cores as well as the undesirable output characteristics thereof may be largely avoided and automatic waveform analyzing apparatus having improved calculating accuracy realized. As shall be seen below, in the automatic waveform analyzing apparatus according to the present invention a magnetic analog memory element in the form of a multiaperture core is disposed at each sampling point, constant amplitude write-in pulses are applied to each such magnetic analog memory element, only one magnetic analog memory element receives write-in pulses at each sampling point so that the limited operating range thereof is most efficiently utilized at each sampling point and the output of each magnetic analog memory element is applied to voltage dividing networks so that the requisite modifying operation as necessitated for weighting factor convergence is obtained. In this manner, the automatic waveform analyzing apparatus of the present invention ensures that the maximum number of write-in pulses can be employed in each multiaperture core so that an extremely precise determination of each optimized weighting factor can be achieved through the attendant increase in learning accuracy.

Figure 7:
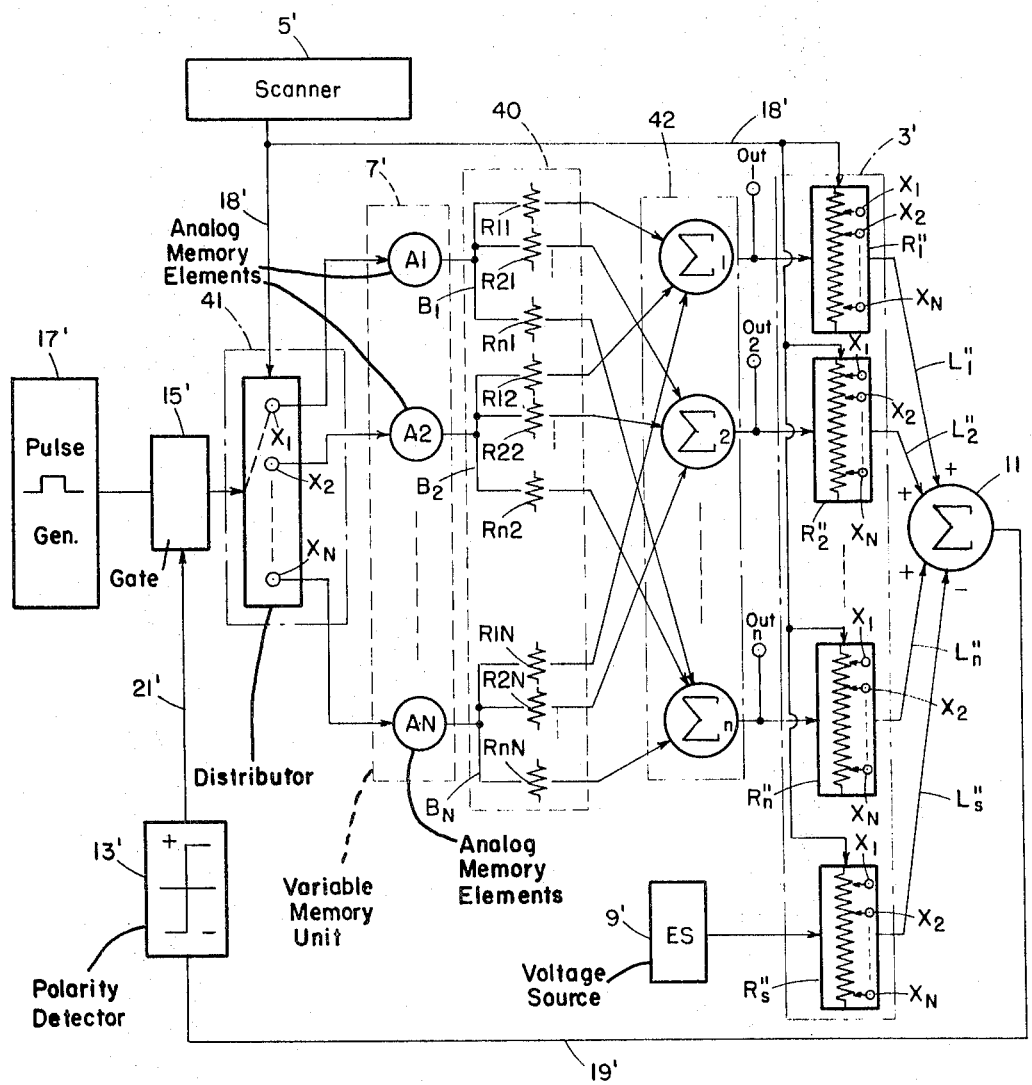
FIG. 7 shows an embodiment of the automatic waveform analyzing apparatus according to the present invention.

Turning now to FIG. 7, there is shown an exemplary embodiment of the automatic waveform analyzing apparatus according to the present invention. As the embodiment of the automatic waveform analyzing apparatus shown in FIG. 7 includes a plurality of circuit portions which are similar to those relied upon in the conventional automatic waveform analyzing apparatus described in conjunction with FIG. 2, where applicable, like circuit portions in FIG. 7 have been given primed reference numerals corresponding to the reference numerals utilized in FIG. 2 and such like circuit portions in FIG. 7 will be described below merely be reference to descriptive matter previously set forth so that undue repetition is avoided. The embodiment of the automatic waveform analyzing apparatus, according to the present invention, shown in FIG. 7 comprises a variable weighting unit 7', first and second input information units 40 and 3', respectively; signal distribution means 41, scanner means 5', branched signal associating means 42, summation means 11', polarity detector means 13', gate means 15' and a write-in pulse generator means 17'. The variable weighting unit 7' may take the same form and perform the same function as the variable weighting unit 7 described in conjunction with FIG. 2 except that the magnetic analog memory elements $A_1$, $A_2...A_N$ thereof are disposed in relation to each sampling point $x_1$, $x_2...x_N$ selected rather than for each fundamental waveform $g_1(x)$, $g_2(x)...g_n(x)$ relied upon. Accordingly, the variable weighting unit 7' is shown in FIG. 7 as including a plurality of magnetic analog memory elements $A_1$, $A_2...A_N$ which may each take the form of the multiaperture core circuit illustrated in FIG. 4. If the number N of sampling point $x_1$, $x_2...x_N$ selected should correspond to the number $n$ of fundamental waveforms $g_1(x)$, $g_2(x)...g_n(x)$ relied upon, it will be appreciated that the variable weighting unit 7' will be structurally identical to the variable weighting unit 7 shown in FIG. 6; however, should the numbers N and $n$ differ, it will be apparent that N magnetic analog memory elements $A_1$, $A_2...A_N$ are present in the variable weighting unit 7', shown in FIG. 7, and each such magnetic analog memory element $A_1$, $A_2...A_N$ present therein will be disposed in relation to and associated with one of the selected sampling points $x_1$, $x_2...x_N$. The function of each magnetic analog storage element $A_1$, $A_2...A_N$ in the variable weighting unit 7', as shall be seen below, is to store a flux level representative of a value for the value of all of the fundamental waveforms $g_1(x)$, $g_2(x)...g_n(x)$ at the particular sampling point $x_1, x_2...x_N$ with which that magnetic analog memory element $A_1, A_2...A_N$ is associated. The variable weighting unit 7' is provided, as shown in FIG. 7, with a plurality of input connections, through conductors $L_1''-L_N''$ from the signal distribution means 41 in a manner such that one such conductor $L_1'', L_2''...L$ is associated with each magnetic analog memory element $A_1, A_2...A_N$ therein and may be considered to be connected to the write winding 26 of the multiaperture core forming such magnetic analog memory element. The signal distribution means 41 may take any conventional form of switching means capable of applying pulses applied to an input thereto to one of a plurality of outputs $x_1, x_2...x_N$ thereof. For instance, the signal distribution means 41 could take the form of conventional stepping switch means whose state is determined by switching signals applied thereto; however, as shall be appreciated by those of ordinary skill in the art, it is preferable if selective switching from the input of the signal distribution means 41 to each of the putputs $x_1, x_2...x_N$ thereof take place through selectively energizable switch means in the same manner described above with regard to the outputs of the various stages of said first and second input information units 1 and 3 described above in conjunction with FIG. 2. Each output $x_1, x_2...x_N$ of the signal distribution means 41 corresponds to a selected sampling point $x_1, x_2...x_N$ and hence the connection of one of such outputs $x_1, x_2...x_N$ to the input of a magnetic analog memory element $A_1, A_2...A_N$, respectively, associates each analog memory element $A_1, A_2...A_N$ present in the variable weighting unit 7' with a selected sampling point $x_1, x_2...x_N$. A switching input to the signal distribution means 41 is connected through cable 18' to the output of the scanner means 5'. The scanner means 5' may take the same form and perform the same function as the scanner means 5 described in conjunction with FIG. 2 and therefore, will selectively provide output signals, in the well-known manner, through cable 18 to the switch input of the signal distribution means 41 to selectively energize the outputs $x_1, x_2...x_N$ thereof. Thus, it will be appreciated that only one output pulse is applied from one of the outputs $x_1, x_2...x_N$ of the signal distribution means 41 to an associated one of the magnetic analog memory element $A_1, A_2...A_N$ present in the variable weighting unit 7'.

An output of each of the magnetic analog memory elements $A_1, A_2...A_N$ present in the variable weighting unit 7' is connected to an associated input of the first input information unit 40. The output of each of the magnetic analog memory elements $A_1, A_2...A_N$ present in the variable weighting unit 7' is derived, as was previously explained in conjunction with FIGS. 2 and 4, from the minor or read aperture 24 of the multiaperture core 20 which is present therein. The first input information unit 40, as shown in FIG. 7, comprises N branching networks $B_1, B_2...B_N$ wherein each branching network is associated with a given one of the selected sampling points $x_1, x_2...x_N$ and is connected to the output of the magnetic analog memory element $A_1, A_2...A_N$ associated with that sampling point. Each of the N branching networks $B_1, B_2...B_N$ may take the conventional form, as shown in FIG. 7, of $n$ parallel conductors which are each commonly connected to an input junction wherein each of such $n$ conductors includes a potentiometer means $R_{11}-R_{n1}, R_{12}-R_{n2}...R_{1N}-R_{nN}$ therein associated with one of the fundamental waveforms $g_1(x), g_2(x)...g_n(x)$. The $n$ potentiometer means $R_{11}-R_{n1}, R_{1N}-R_{nN}$ present in each of the N branching networks $B_1, B_2...B_N$ may be conventional devices which, as will be seen below, are preset to a value which is proportional to the value of a given fundamental waveform $g_1(x), g_2(x), g_n(x)$ at the sampling point $x_1, x_2...x_N$ associated therewith. To facilitate rapid identification, the potentiometer means $R_{11}-R_{n1}, R_{12}-R_{n2}...R_{1N}-R_{nN}$ present in each branching network $B_1, B_2...B_N$ have been given a subscript notation which serves to readily denote both the fundamental frequency $g_1(x), g_2(x)...g_n(x)$ associated therewith as well as the sampling point $x_1, x_2...x_N$ associated with the branching network in which it resides. In the subscript notation adopted for each of the potentiometer means $R_{11}-R_{n1}, R_{1N}-R...R_{1N}-R_{nN}$, the first numeral thereof indicates the fundamental waveform $g_1(x), g_2(x)...g_n(x)$ associated with a particular potentiometer means while the second numeral thereof indicates the selected sampling point $x_1, x_2...x_N$ therefor. Accordingly, it will be seen that for the potentiometer means $R_{11}-R_{n1}$ present in the first branching network $B_1$, the first subscript thereof indicates that the potentiometer means $R_{11}, R_{21}...R_{n1}$ are associated with the fundamental waveforms $g_1(x), g_2(x)...g_n(x)$, respectively, while the second subscript thereof indicates that each potentiometer means $R_{11}-R_{n1}$ in the first branching network $B_1$ is associated with the first sampling point $x_1$. The corresponding $n$ outputs of each branching network $B_1, B_2...B_N$ are connected to one of the $n \cdot N$ inputs to the branched signal associating means 42. Thus, the value of readout pulses derived from each magnetic analog memory element $A_1, A_2...A_N$ represents a value indicative of the value of all of the fundamental waveforms $g_1(x), g_2(x)...g_n(x)$ at each of the selected sampling points $x_1, x_2...x_N$, respectively, while the $n$ outputs of each of the N branching networks $B_1, B_2...B_N$ represent $n$ values which are proportional to the $n$ fundamental waveforms $g_1(x), g_2(x)...g_n(x)$ evaluated at the sampling point $x_1, x_2...x_N$ with which such branching networks $B_1, B_2...B_N$ are associated.

The branched signal associating means 42 comprise, as shown in FIG. 7, $n$ adder means $\Sigma 1-\Sigma n$ wherein each adder means $\Sigma 1, \Sigma 2...\Sigma n$ is associated with one of the $n$ fundamental waveforms $g_1(x), g_2(x)...g_n(x)$, respectively. Each of the $n$ adder means $\Sigma 1-\Sigma n$ may take the form of a conventional adder circuit which includes N input terminals and one output terminal and acts in the well-known manner to sum each of the input signals applied thereto which here represent the values of a particular fundamental waveform $g_1(x), g_2(x)$ at each of the N selected sampling points $x_1, x_2...x_N$. Each of the N corresponding inputs to each of the $n$ adder means $\Sigma 1-\Sigma n$ is connected to a corresponding output of one of the N branching networks $B_1, B_2...B_N$ so that each of said adder means $\Sigma 1, \Sigma 2...\Sigma n$ is associated with a particular fundamental waveform $g_1(x), g_2(x)...g_n(x)$, respectively, and produces an output proportional to the value of a particular fundamental waveform $g_1(x), g_2(x)...g_n(x)$ at each of the sampling points $x_1, x_2...x_N$. Accordingly, it will be appreciated that the N branching networks $B_1-B_N$ of the first input information unit 40 are disposed on a sampling point basis and the $N \cdot n$ outputs of the first input information unit 40 are connected to the $N \cdot n$ inputs of the branched signal associating means 42 in a manner such that they are reorganized on a basis of the $n$ fundamental waveforms $g_1(x), g_2(x)...g_n(x)$. The $n$ outputs of the $n$ adder means $1-n$ present in the branched signal associating means 42 are applied to associated inputs of the second input information unit 3' through the output conductor means $O_1', O_2'...O_n'$ provided therefor.

The output conductor means $O_1', O_2'...O_n'$ and the second input information unit 3', as shown in FIG 7, take the same form and perform the same function as the output conductor means $O_1, O_2...O_n$ and the second input information unit 3 described in conjunction with FIG. 2. Accordingly, the second input information unit 3' includes $n$ stages $R_1'', R_2''...R_n''$ which are each associated with a fundamental waveform $g_1(x), g_2(x)...g_n(x)$, respectively, and each of the output conductor means $O_1', O_2'...O_n'$ is connected to the input of one of such stages $R_1'', R_2''...R_n''$. In addition, each of the output conductor means $O_1', O_2'...O_n'$ is provided with an output terminal means $Out_1, Out_2...Out_{n1}$, respectively, so that the signals present on the output conductor means $O_1', O_2'...O_n'$, which as shall be seen below are representative of the weighting factor values $W_1, W_2...W_n$ associated with each fundamental waveform $g_1(x), g_2(x)...g_n(x)$, are available.

As will be recalled from the description of FIG. 2, the second input information unit 3' not only includes one stage $R_1'', R_2''...R_n''$ associated with each of the fundamental waveform $g_1(x), g_2(x)...g_n(x)$, respectively, but in addition thereto includes a further stage $R_x''$ associated with the designated arbitrary waveform $f(x)$ to be analyzed. The input to the stage $R_x''$ of the second input information unit 3' is connected to a reference voltage source means 9'. The reference voltage source means 9' was described in conjunction with FIG. 2 and may therefore comprise any conventional generator means capable of applying a voltage to the input of stage $R_s''$ of the second information unit 3' which is of an appropriate magnitude for division thereby into the requisite voltage magnitudes proportional to the values of the designated arbitrary waveform $f(x)$ as sampled at the N sampling points $x_1, x_2...x_N$. Each of the $n+1$ stages $R_1'', R_2''...R_n''+R_s''$ of the second input information unit 3', as was the case for the conventional automatic waveform analyzing apparatus described in conjunction with FIG. 2, includes voltage divider means having N presettable taps $x_1, x_2...x_N$ thereon which presettable taps are each associated with one of the N sampling points $x_1, x_2...x_N$. Accordingly, it will be seen that the second input information unit 3' includes $n+1$ stages $R_1'', R_2''...R_n''+R_s''$ arranged in the column direction such that each of such $n+1$ stages is associated, respectively, with one of the $n+1$ waveforms $g_1(x), g_2(x)...g_n(x)$ and $f(x)$ and each of such $n+1$ stages $R_1'', R_2''...R_n''+R_s''$ includes voltage divider means having N presettable taps $x_1, x_2...x_N$ thereon so that N values may be initially set which values are proportional to the sampled value of the waveform associated therewith at each of N sampling points $x_1, x_2...x_N$. The output of each stage $R_1'', R_2''...R_n''$ and $R_s''$ of the second input information unit 3' is connected through an associated conductor $L_1'', L_2''...L_n''$ and $L_s''$, respectively, to a corresponding input of the summation means 11'. The conductors $L_1'', L_2''...L_n''$ and $L_s''$ are connected to each of the presettable taps $x_1, x_2...x_N$ of the stage associated therewith through a plurality of selectively actuable switch means, not shown herein, in the same manner as was described for the connection of each stage $R_1', R_2'...R_n'$ of the second information unit 3 to the conductors $L_1', L_2'...L_n'$ described in conjunction with FIG. 3. Each stage $R_1'', R_2''...R_n''$ and $R_s''$ of the second input information unit 3' is commonly connected to the scanner means 5' through the cable 18' so that each of the commonly located switch means therein may be selectively actuated by said scanner means 5' in the manner described above with regard to the second input information unit 3' shown in FIG. 2.

The summation means 11' may take the same form of conventional adder means as was described in conjunction with FIG. 2 and acts in the well-known manner to algebraically sum each of the input signals applied thereto and produce an output signal representative thereof. As indicated by the plus (+) and minus (−) signs associated with the various inputs to the summation means 11', the inputs applied thereto by the conductor means $L_1'', L_2''...L_n''$ and associated with each fundamental waveform $g_1(x), g_2(x)...g_n(x)$ are applied having a first polarity while the input applied thereto by the conductor means $L_s''$ and associated with the designated, arbitrary waveform $f(x)$ is applied having a second polarity. The manner in which the input applied to the summation means 11' by the conductor $L_s''$ is inverted to thereby exhibit a one hundred eighty degree (180°) phase inversion with respect to the inputs applied by conductors $L_1'', L_2''...L_n''$ may comprise any of those mentioned in this regard with respect to the description of FIG. 2. The output of the summation means 11' thus represents the sum at a given instant of signals present on conductors $L_1'', L_2''...L_n''$ which are associated, as aforesaid, with the fundamental waveforms $g_1(x), g_2(x)...g_n(x)$ minus the signal present on the conductor $L_s''$ at such instant which is representative of the designated, arbitrary waveform $f(x)$.

The output of the summation 11' means is connected to an input of the polarity detector means 13' through the conductor 19'. The polarity detector means 13' may take the same form of conventional means, such as polarity discriminator described in conjunction with FIG. 2 and is thus capable of detecting the polarity of input signals applied thereto and producing an output signal representative thereof. The output of the polarity detector means 13' is connected through the conductor 21' to a switching input of the gate means 15'. The gate means 15' may take the same form as described above with reference to FIG. 2 and therefore acts in the well-known manner to apply first or second polarity pulses to the output thereof in response to the nature of the input signals received at the switching input thereto. In the case of the automatic waveform analyzing apparatus according to this invention, as shown in FIG. 7, the gate means 15' should be considered as applying signals having a first polarity to the output thereof when the signal applied to the switching input thereof by the polarity detector 13' represents one polarity and signals having a second polarity to the output thereof when the signals applied thereto by said polarity detector means 13' are representative of another polarity. The gate means 15' is connected at the signal input thereof to the write pulse generator means 17'. The write pulse generator means 17' may take any forms of conventional core driver sources mentioned in conjunction with FIG. 2 which act in the well-known manner to apply write pulses to the signal input of the gate means 15' for application to the output thereof. As is well known, the write pulse generator means 17' may comprise constant pulse source means, stabilized voltage source means, stabilized current source means or other well known core driver circuits. The output of the gate means 15' is connected to the input of the signal distribution means 41 for selective application to outputs $x_1, x_2...x_N$ thereof.

Prior to the operation of the automatic waveform analyzing apparatus according to the present invention, as shown in FIG. 7, it will be understood that two calibrations must be performed. The first calibration involves the first input information unit 40 and more particularly requires the presetting of each of the potentiometer means $R_{11}-R_{n1}, R_{12}-R_{n2}...R_{1N}-R_{nN}$ therein so that values will be obtained therefrom which are proportional to the values of the fundamental waveform $g_1(x), g_2(x)...g_n(x)$ associated therewith at its associated sampling point $x_1, x_2...x_N$. For instance, as each of the potentiometer means $R_{11}-R_{nl}$ present in the branching network $B_1$ is connected to the output of the magnetic analog memory element $A_1$ and hence is associated with the sampling point $x_1$, each of the potentiometer means $R_{11}-R_{12}...R_{nl}$ present therein is set so that the magnitude of an input pulse applied to the branching network $B_1$ will be suitably attenuated at each potentiometer means $R_{11}, R_{12}...R_{nl}$ so as to be proportional to the value of the fundamental waveform $g_1(x_1), g_2(x_1)...g_n(x_1)$, respectively, at the sampling point $x_1$, as shown in FIGS. 3A-3C. In a similar manner the potentiometers $R_{12}-R_{n2},...R_{1N}-R_{nN}$ present in each of the branching networks $B_2-B_N$ are adjusted to produce output values proportional to the values of the fundamental waveforms $g_1(x), g_2(x)...g_n(x)$ at the selected sampling points $x_2-x_N$ 3C. Thus, each branching network $B_1-B_N$ has each branch thereof set for a value proportional to the fundamental waveforms $g_1(x), g_2(x)...g_n(x)$ associated therewith at the sampling point $x_1-x_N$ with which that branching network $B_1-B_N$ is disposed. The manner in which the resistance values for presetting the potentiometer means $R_{11}-R_{n1}, R_{12}-R_{n2}...R_{1N}-R_{nN}$ are calculated for the first calibration is well known and hence will not here be described; however, it should be noted that as such first calibration deals with the proportional attenuation of a common value input pulse for each branching network $B_1-B_N$, it does not involve complex procedures.

The second calibration requires that each of the plurality of presettable taps $x_1, x_2...x_N$ of each of the stages $R_1'', R_2''...R_n''$ and $R_s''$ of the second input information unit 3' be initially set at a value proportional to the value of the waveforms $g_1(x), g_2(x)...g_n(x)$, and $f(x)$, respectively, at the sampling point associated with that tap. This second calibration was explained in conjunction with the calibration of the first and second input units 1 and 3 shown in FIG. 2 and accordingly will not be repeated here, it being understood that resistance values proportional to the sampling values indicated in FIGS. 3A-3D are calculated, i.e., $g_1(x_1)-g_1(x_N), g_2(x_1)-g_2(x_N)...g_n(x_1)-g_n(x_N)$ and $f(x_1)-f(x_N)$ and such values are preset at the appropriate presettable taps $x_1, x_2...x_N$ therefor in each stage $R_1'', R_2''...R_n''$ and $R_s''$ of the second input information unit 3''.

Upon completion of the foregoing calibration procedures, the operation of the automatic waveform analyzing apparatus according to this invention, as shown in FIG. 7, may be initiated. The description of the operation of the automatic waveform analyzing apparatus shown in FIG. 7 will proceed upon the initial assumption that when such automatic waveform analyzing apparatus is energized the scanner means $5'$ will be in a condition such that the $x_1$ output of the signal distribution means 41 will be effectively connected to the input thereof and the presettable tap $x_1$, in each stage $R_1''$, $R_2''...R''$ and $R_s''$ of the second input information unit $3'$ is effectively connected through enabled switch means, not shown, to the conductors $L_1''$, $L_2''...L_n''$ and $L_s''$ associated therewith. Conversely, for this assumed state of the scanner means $5'$, none of the outputs $x_2-x_N$ of the signal distribution means 41 will be effectively connected to the input thereof and none of the presettable taps $x_2-x_N$ of each of stage $R_1''$, $R_2''...R''$ and $R_s''$ of the second input information unit $3'$ will be effectively connected to the conductors $L_1''$, $L_2''...L_n''$ and $L_s''$ associated therewith. Although the foregoing initial conditions have been assumed herein, it will be manifest to those of ordinary skill in the art that the automatic waveform analyzing apparatus shown in FIG. 7 may operate under any set of initial conditions as dictated by the initial state of the scanner means $5'$.

When the automatic waveform analyzing apparatus shown in FIG. 7 is energized, read pulses will be applied to each of the magnetic analog memory elements $A_1, A_2...A_N$ present in the variable weighting unit $7'$ in the same manner as described above in conjunction with the conventional automatic waveform analyzing apparatus shown in FIG. 2. As each of the magnetic analog memory elements $A_1, A_2...A_N$ may include the multiaperture core circuit shown in FIG. 4, it will be appreciated that each of said magnetic analog memory elements $A_1, A_2...A_N$ will be nondestructively read in the well-known manner to thereby produce a readout pulse whose magnitude is representative of the flux level then present in such multiaperture core. For the purpose of explanation, it may be further assumed that each multiaperture core present in the variable weighting unit $7'$ is initially in the blocked state, as represented by the lower remanent position of the hysteresis loop shown in FIG. 6, and thus the readout pulse produced by each of the magnetic analog memory elements $A_1, A_2...A_N$ upon the initial reading thereof will be maximized as was explained above in conjunction with FIG. 4. The readout pulses produced by each of the magnetic analog memory elements $A_1, A_2...A_n$, upon the reading thereof, will be applied to the branching network $B_1, B_2...B_N$, respectively, associated therewith. As each of the analog memory elements $A_1, A_2...A_N$, is disposed, as aforesaid, in relation to each of the selected sampling points $x_1, x_2...x_N$, respectively, it will be seen that each readout pulse produced thereby is indicative of the flux level of the multiaperture core therein and will thereby be related to the weighting factor components of all of the fundamental waveforms $g_1(x), g_2(x)...g_n(x)$ associated with the sampling point $x_1, x_2...x_N$. Thus, the readout pulse applied to the branching network $B_1$ will be related to the weighting factor components of all the fundamental waveforms $g_1(x), g_2(x)...g_n(x)$ associated with the sampling point $x_1$, the readout pulse applied to the branching network $B_2$ will be related to the weighting factor components of all the fundamental waveforms $g_1(x), g_2(x)...g_n(x)$ associated with the sampling point $x_2$, etc.

The readout pulse applied to each of the branching networks $B_1, B_2...B_N$ is applied to each of the $n$ arms thereof and is suitably attenuated by the potentiometer means $R_{11}-R_{n1}$, $R_{12}-R_{n2}...R_{1N}-R_{nN}$ present in each arm. The amount of attenuation received by the readout pulses applied to each of the $n$ arms in a given branching network $B_1-B_N$ is dictated by the initial values of resistance set at each of the potentiometer means $R_{11}-R_{n1}$, $R_{12}-R_{n2}...R_{1N}-R_{nN}$. Thus, as the value of the readout pulse supplied to each branching network $B_1-B_N$ is related to the value of all the fundamental waveforms $g_1(x)$, $g_2(x)...g_n(x)$ at the particular sampling point $x_1-x_N$ associated with that branching network $B_1-B_N$, respectively, and the resistance values of the $n$ potentiometer means $R_{11}-R_{n11}$, $R_{12}-R_{n2}...R_{1N}-R_{nN}$ in that branching network $B_1, B_2...B_N$ have been present at values which are proportional to the values of the $n$ fundamental waveforms $g_1(x), g_2(x)...g_n(x)$ at the sampling point $x_1, x_2...x_N$, it will be appreciated that the value of the readout pulse present at the output of each potentiometer means $R_{11}-R_{n1}$, $R_{12}-R_{n2}...R_{1N}-R_{nN}$ will be proportional to the value of the fundamental waveform $g_1(x), g_2(x)...g_n(x)$ associated with that potentiometer means at a value corresponding to the sampling point $x_1-x_N$ associated with the branching network $B_1-B_N$ in which that potentiometer means resides. For instance, if the branching network $B_1$ is considered, it will be recalled that the branching network $B_1$ is disposed in relation to the sampling point $x_1$ and hence the readout pulse applied thereto is related to the values of all the fundamental waveforms $g_1(x_1), g_2(x_1)...g_n(x_1)$ at the sampling point $x_1$. When the readout pulse received by the branching network $B_1$ is applied to the $n$ arms thereof, such readout pulse will be attenuated by the present potentiometer means $R_{11}, R_{21}...R_{nl}$ in the $n$ arms thereof in a manner which is proportional to the value of the fundamental waveforms $g_1(x_1), g_2(x_1)...g_n(k_1)$ at the sampling point $X_1$. Accordingly, the magnitude of the output pulse produced at each of the $n$ arms of the branching network $B_1$ will be proportional to the weighting factor component associated with each fundamental waveform $g_1(x)$, $g_2(x)...g_n(x)$ at the sampling point $x_1$. Similarly, it will be appreciated that the magnitude of the output of each of the $n$ arms of each of the remaining branching networks $B_2-B_N$ present in the first input information unit 40 will be proportional to the weighting factor components associated with each fundamental waveform $g_1(x), g_2(x)...g_n(x)$ at the sampling points $x_2-x_N$, respectively, with which they are associated. The pulses thus present at the outputs of the $n$ arms of each branching network $B_1-B_N$ thereby represent the flux level of the multiaperture core in the magnetic analog memory element $A_1-A_N$ associated therewith as suitably attenuated in a manner which is proportional to the initially set value of the fundamental waveforms $g_1(x), g_2(x)...g(x)$ associated with that arm, at the sampling point $x_1-x_N$ associated with the branching network $B_1-B_N$ in which such arm resides. Thus, each branching network $B_1-B_N$ serves to apportion the sampling point associated readout pulse received thereby into pulses whose magnitudes are related to the value of each fundamental waveform $g_1(x), g_2(x)...g_n(x)$ at the sampling point $x_1-x_N$ associated therewith.

The branched signal associating means 42 comprises, as aforesaid, $n$ adder means $\Sigma_1-\Sigma_n$ wherein each of said adder means $\Sigma_1-\Sigma_n$ includes N inputs and is associated with one of the fundamental waveforms $g_1(x), g_2(x)...g_n(x)$. Accordingly, the $n \cdot N$ output pulses produced by the first input information unit 40 when the magnetic analog memory elements $A_1-A_N$ are read are applied to the branched signal associating means 42 in a manner such that each of the $n$ adder means $\Sigma_1-\Sigma_n$ therein receives only the N outputs of the first input information unit 40 which are proportional to the value of the fundamental waveform $g_1(x), g_2(x)...g_n(x)$ with which that adder means $\Sigma_1, \Sigma_2...\Sigma_n$, respectively, is associated. Thus, each of the $n$ adder means $\Sigma_1-\Sigma_n$ receives at the N inputs thereto N output pulses from the first input information unit 40 wherein each of such N output signals is proportional to the same fundamental waveform but is evaluated at a different one of the N selected sampling points $x_1-x_N$. This is accomplished, as shown in FIG. 7, by connecting the output of each correspondingly positioned arm of each of the N branching networks $B_1-B_N$, which arms also correspond as to the fundamental frequency with which they are associated, to one of the N inputs of the adder means $\Sigma_1-\Sigma_n$ associated with that frequency. For example, the output of the uppermost arm, i.e., that including the potentiometer means $R_{11}, R_{12}...R_{1N}$, of each branching network $B_1-B_N$ is applied to the adder means $\Sigma_1$ associated with the fundamental waveform $g_1(x)$, the output of the N arms in the N branching networks $B_1$–$B_N$ which include the potentiometer means $R_{21}$, $R_{22}$...$R_{2N}$ are applied to the adder means $\Sigma_2$ associated with the fundamental waveform $g_2(x)$ and the output of the N lowermost arms, i.e., those including the potentiometer means $R_{n1}$, $R_{n2}$...$R_{nN}$, are applied to the adder means $\Sigma_n$ associated with the fundamental waveform $g_n(x)$. Thus it is seen that each of the $n$ adder means $\Sigma_1$–$\Sigma_n$ receive N input pulses each time the magnetic analog memory elements $A_1$–$A_N$ are read out and each of said N input pulses are proportional to the values of the fundamental waveform $g_1(x)$, $g_2(x)$...$g_n(x)$ associated with that adder means $\Sigma_1, \Sigma_2...\Sigma_n$, respectively, wherein each N input pulses are evaluated at each of the N sampling points $x_1$–$x_N$, respectively.

Each of the $n$ adder means $\Sigma_1$–$\Sigma_n$ present in the branched signal associating means 42 acts in the well-known manner to algebraically sum each of the $n$ input pulses received thereby and produce an output pulse representative of each sum. Accordingly, the pulses thus presented at the outputs of each of adder means $\Sigma_1, \Sigma_2...\Sigma_n$ represents the sum of the flux levels of the multiaperture core present in each of the magnetic analog memory elements $A_1$–$A_N$ after such flux levels have been suitably apportioned by the branching networks $B_1$–$B_N$ to represent a value proportional to the value of a particular one of the fundamental waveforms $g_1(x)$, $g_2(x)$...$g_n(x)$ as evaluated at each of the selected sampling points $x_1$–$x_N$. The adder means $\Sigma_1, \Sigma_2...\Sigma_n$ present in the branched signal associating means 42 thereby act to reorganize the selectively attenuated readout pulses produced by the readout of the analog storage elements $A_1$–$A_N$ from the sampling point organization originally associated with the sampling point disposition of the magnetic analog storage elements $A_1$–$A_N$ to the fundamental waveform disposition associated with the disposition of the adder means $\Sigma_1$–$\Sigma_n$. Accordingly, it will be appreciated that each of the adder means $\Sigma_1$–$\Sigma_n$ thus combine each weighting factor component associated with a particular fundamental waveform $g_1(x)$, $g_2(x)$...$g_n(x)$ as derived from each sampling point $x_1$–$x_N$ to thereby produce an output signal which is proportional to the weighting factor $W_1$, $W_2$...$W_n$ for the fundamental waveform $g_1(x)$, $g_2(x)$...$g_n(x)$ associated therewith.

The readout pulses thus present at the outputs of the adder means $\Sigma_1$, $\Sigma_2$...$\Sigma_n$ are applied through the conductors $0_1$, $0_2$...$0_n$ to stages $R_1''$, $R_2''$...$R_n''$, respectively, of the second input unit 3' and are also available at the outputs $Out_1$, $Out_2$...$Out_n$ associated with such conductors. Under the initial conditions assumed above, only the presettable tap $x_1$, of each of the stages $R_1''$, $R_2''$...$R_n''$ is operably connected to the conductor $L_1''$, $L_2''$...$L_n''$ associated therewith. Therefore, under these conditions, as explained above in conjunction with FIG. 2, the readout pulses applied to each stage $R_1''$, $R_2''$...$R_n''$ of the second input information unit 3' will be attenuated to a degree dictated by the setting of the tap $x_1$ associated with that stage and applied to the conductor $L_1''$, $L_2''$...$L_n''$ associated therewith. Thus, each pulse representing a weighting factor $W_1$, $W_2$...$W_n$ for a particular one of the fundamental waveforms $g_1(x)$, $g_2(x)$...$g_n(x)$ is attenuated by the setting of the presettable tap means under these conditions, in a manner to render it proportional to the value of its associated fundamental waveform $g_1(x_1)$, $g_2(x_1)$...$g_n(x_1)$ at the sampling point $x_1$ as indicated in FIGS. 3A–3C.

In a similar manner, when such readout pulses are applied to stages $R_1''$, $R_n''$ of the second input information unit 3', the voltage reference source means 9 will apply a reference pulse to the stage $R_s''$ of the second input information unit 3'. The pulse applied to stages $R_s''$ is suitably attenuated by the setting of the presettable tap $x_1$ in stage $R_s''$ so that the magnitude of the pulse is applied to the conductor $L_s''$ is proportional to the magnitude of the designated arbitrary waveform $f(x)$ at sampling point $x_1$ as indicated in FIG. 3D. Accordingly, it will be appreciated that each of the conductor $L_1''$, $L_2''$...$L_n''$ has a pulse thereon during this interval which represents the sum of the flux states of the multiaperture cores in each of the magnetic analog memory elements $A_1$, $A_2$...$A_n$ apportioned to represent the weighting factor for a particular fundamental waveform $g_1(x)$, $g_2(x)$...$g_n(x)$ associated therewith and as suitably attenuated by the tap setting $x_1$ in its associated stage $R_1''$, $R_2''$...$R_n''$, while the conductor $L_s''$ has a pulse thereon whose value is proportional to the value of the designated arbitrary waveform $f(x)$ at the sampling point $x_1$. The pulses present on the conductors $L_1''$, $L_2''$...$L_n''$ and $L_s''$ are each applied to their respective inputs of the summation means 11' with the pulses present on conductor $L_s''$ being inverted, as aforesaid, by one hundred eighty degrees (180°). The summation means 11' acts in the well-known manner on each of the input pulses received thereby to algebraically add such input pulses and produce an output signal representative of the sum thereof. Under the conditions presently being discussed, it will be seen that since the input pulse present on conductor $L_s''$ is inverted with respect to each of the other input pulses applied, the output pulse produced by said summing means is representative of a value proportional to the expression $W_{10}g_1(x_1)+W_{20}g_2(x_1)...+_{n0}g_n(x_1)-f(x_1)$. The output of the summation means 11', which may take the form of a pulse whose magnitude and polarity are representative of the result of the foregoing summation process, is applied to the input of the polarity detector means 13' through the conductor 19'. The polarity detector means 13' acts in the conventional manner to discriminate the input pulse received thereby as to polarity and to produce an output representative of the polarity of the input signal received. If it is assumed that each of the multiaperture cores present in the variable weighting unit 7' was initially in its blocked state, it will be appreciated that the pulses read out therefrom will be large and hence the sum of the pulses present on the conductors $L_1''$, $L_2''$...$L_n''$ will here exceed the pulse present on the conductor $L_s''$ whereby the output of the summing means 11' will be of a positive polarity. Under these conditions, the polarity detector means 13' will produce an output signal representative of the presence of a positive polarity input signal and such output signal will be applied to the switching input of the gate means 15'.

The gate means 15' acts in the well-known manner to apply either a positive or negative write-in pulse from the write pulse generator means 17' to the input of the signal distribution means 41 in response to each input signal received at the switching input thereof from the polarity detector means 13'. Therefore, under the conditions mentioned above, wherein the polarity detector means 13' generates a signal indicating that the output of the summing means 11' is of a positive polarity, the gate means 15' will be enabled in a manner such that a positive polarity write-in pulse is applied therethrough to the input of the signal distribution means 41. Under the initial conditions assumed above, the scanner means 5' has set the conditions of the signal distribution means 41 so that only the output $x_1$ thereof is effectively connected to the input of said signal distribution means 41. Accordingly, the positive polarity write-in pulse applied, as stated above, to the input of the signal distribution means 41 will be further applied thereby through the output $x_1$ thereof to the input of only the magnetic analog memory element $A_1$ which is disposed, as aforesaid, with respect to the sampling point $x_1$, while no write-in pulses are received by any other magnetic analog memory elements $A_2$–$A_N$. As the inputs associated with each of the magnetic analog memory elements $A_1$–$A_N$ may be considered to be connected to the write winding of the multiaperture core present therein, in the manner set forth above in conjunction with FIGS. 2 and 4, the write-in pulse applied to the magnetic analog memory element $A_1$ for the initial cycle of operation presently under discussion will act in the well-known manner to change the flux level of the multiaperture core therein in the manner discussed anent FIGS. 4–6. The degree of the flux level change which thereby takes place in the multiaperture core present in the magnetic analog memory element $A_1$ will here depend on the magnitude and duration of the write-in pulse, which is here fixed solely by the write pulse generator means 17', as well as the past history of such multiaperture core as explained above in regard to FIGS. 4–6. Accordingly, when the magnetic analog memory elements $A_1$-$A_N$ are subsequently read out, the magnitude of the readout pulse derived from the multiaperture core present in the magnetic analog memory element $A_1$ will reflect the new flux level thereof while readout pulses derived from the multiaperture cores present in the magnetic analog elements $A_2$-$A_N$ will retain their initial values as the write-in learning function has here been carried out solely with respect to the magnetic analog memory element $A_1$ associated with the sampling point $x_1$. Therefore, it will be seen that after the completion of the first cycle of operation of the automatic waveform analyzing apparatus according to the present invention, the flux level of the multiaperture core present in the magnetic analog memory element $A_1$ will have been modified independently of the other magnetic analog memory elements $A_2$-$A_N$ and thus only the weighting factor components of the fundamental waveform $g_1(x)$, $g_2(x)...g_n(x)$ associated with the sampling point $x_1$ will be affected thereby.

Upon completion of the first cycle of operation of the automatic waveform analyzing apparatus, as set forth above, the scanner means $5'$ will step the signals applied thereby to cable $18'$ so that the connection of the output $x_1$ of the signal distribution means 41 to the input thereof and the connection of the presettable tap means $x_1$ in each stage $R_1''$-$R_n''$ and $R_s''$ of the second input information unit $3'$ to the conductors $L_1''$-$L_n''$ and $L_s''$, associated therewith are disabled; while connections of the output $x_2$ of the signal distribution means 41 to the input thereof and the connection of the presettable tap means $x_2$ in each stage $R_1''$-$R_n''$ and $R_s''$ of the second input information unit $3'$ to the associated conductors $L_1''$-$L_n''$ and $L_s''$ through the switch means therefor are enabled. Thereafter, each of the magnetic analog memory elements $A_1$-$A_N$ present in the variable weighting unit $7'$ is again read in a nondestructive manner so that a new output pulse is derived from the output of the summation means $11'$ which is relied upon to cause a properly directed, constant amplitude write-in pulse to be applied to only the analog storage element $A_2$ of the variable weighting unit $7'$ to change the flux level thereof. Thus, the magnetic analog memory element $A_2$ here has the flux level of the multiaperture core present therein independently modified by a constant magnitude write-in pulse applied thereto when the output $x_2$ of the signal distribution means 41 and the presettable tap $x_2$ are utilized so that the output pulses produced by each of the adder means $\Sigma_1$-$\Sigma_n$ are further modified due to the modified value of the weighting factor components for each of the fundamental waveforms $g_1(x)$, $g_2(x)...g_n(x)$ which are associated with the sampling point $x_2$ and hence the magnetic analog memory element $A_2$. Upon the completion of the second cycle of operation of the automatic waveform analyzing apparatus shown in FIG. 7, further cycles of operation are initiated until each of the $x_1$-$x_N$ of the signal distribution means 41 and each of the presettable taps $x_1$-$x_N$ present in stages $R_1''$-$R_n''$ and $R_s''$ have been sequentially utilized and hence the flux levels of the multiaperture cores present in the magnetic analog memory elements $A_1$-$A_N$ are sequentially modified. Thereafter the scanner means $5'$ again enables all of the switch means associated with the output $x_1$ of the signal distribution means 41 and the presettable taps $x_1$ and the sequential connection is again stepped through each of the outputs $x_1$-$x_N$ of the signal distribution means 41 and the presettable taps $x_1$-$x_N$ so that additional sets of N cycles of operation are obtained.

As will be appreciated by those of ordinary skill in the art, the function of the first input information unit 40 is to ensure that the modification of the weighting factor components associated with each selected sampling point $x_1$-$x_N$ for each fundamental waveform $g_1(x)$-$g_n(x)$ and hence the modification of each weighting factor value $W_1$-$W_n$ is accomplished in proportion to the values of the individual fundamental waveform $g_1(x)$A-$g_n(x)$ in accordance with known perception convergence techniques. This function is achieved in the automatic waveform analyzing apparatus according to the present invention by selectively modifying the amplitude of each readout pulse derived from the magnetic analog memory elements $A_1$-$A_N$ by the potentiometer means present in each branching network $B_1$-$B_N$ of the first input information unit 40 as initially established by the first calibration procedure mentioned above. Therefore, as each cycle of operation of the automatic waveform analyzing apparatus shown in FIG. 7 is repeated, the flux level of the multiaperture cores will be sequentially modified and hence the output pulses produced by the adder means $\Sigma_1$-$\Sigma_n$ will converge toward an optimum value while the output pulses produced by the summation means $11'$ will gradually approach zero. When the output of the summation means $11'$ approaches zero the learning process wherein pulses of constant magnitudes are selectively applied to the multiaperture cores to achieve the required flux level will cease as polarity indicative signals are no longer applied to the switching input of gate means $15'$ by the polarity detector means $13'$. Thereafter, when read pulses are applied to the multiaperture core in each of the magnetic analog elements $A_1$-$A_N$, the optimized value of the pulses read out from each adder means $\Sigma_1$-$\Sigma_n$ may be obtained from the output terminal means $Out_1, Out_2...Out_n$. The optimized weighting factor $W_{opt1}, W_{opt2}...W_{optn}$, which are proportional to the values of the pulses obtained from the output terminal means $Out_1, Out_2...Out_n$, may thus be obtained and the analysis of the designated arbitrary waveform $f(x)$ completed.

From the description of the automatic waveform analyzing apparatus according to the present invention, as shown in FIG. 7, it will be appreciated that the overall structural organization thereof and the manner in which the each of the magnetic analog memory elements $A_1$-$A_N$ are disposed in relation to the selective sampling points $x_1$-$x_N$, enables substantial improvements in the accuracy and learning techniques available when compared to conventional forms of automatic waveform analyzing apparatus such as that shown in FIG. 2. For instance, since each magnetic analog memory element $A_1$-$A_N$ is disposed in relation to only one of the selected sampling points $x_1$-$x_N$, the flux level of the multiaperture core therein is individually adjusted in response only to the sampling cycles which take place at that one sampling point rather than at each sampling point as in conventional arrangements. Therefore, the entire available operating range for flux level modification in each multiaperture core may be utilized regardless of whether or not a particular multiaperture core is quickly driven to a flux level where further flux level adjustments can no longer take place. Thus, the operation of each of the multiaperture cores can not be limited as a group by the operation of a single core therein and hence a much wider range of operation is available so that the learning process employed may achieve extremely precise values for the optimized weighting factors developed. Furthermore, since only one multiaperture core is associated with each sampling point, it is not necessary to vary the input values applied to each analog memory element with each shift of the sampling point. This permits the value of the write-in pulses relied upon to be constant in magnitude.

In addition, the manner in which the weighting factor value is rendered proportional to the value of the fundamental waveform associated therewith at the output portion of each magnetic analog memory element rather than at the write-in portions thereof allows each of the multiaperture cores present in such analog memory elements to operate over a greater range in that more discrete flux level modifying operations may be accomplished in each such magnetic analog memory element. Furthermore, attenuation carried out at the output of a multiaperture core will yield a true proportional relationship whereas in conventional apparatus a proportional relationship between the write-in pulse and readout pulse will not always obtain. Accordingly, marked improvements in the accuracy of the learning techniques employed and the precision of the values of the optimized weighting factors derived therefrom may be achieved.

Although the present invention has been disclosed in conjunction with the exemplary embodiment shown in FIG. 7, many modifications and variations thereof will be apparent to those of ordinary skill in the art. Therefore, the present invention should not be considered as limited to the specific embodiment shown herein.

What is claimed is:

1. Automatic waveform analyzing apparatus for deriving arbitrary waveforms by the synthesis of a plurality of optimumly weighted fundamental waveforms whose optimum weighting factors are determined by repeatedly sampling said plurality of fundamental waveforms at a plurality of sampling points and modifying previously established values for such weighting factors in response to values obtained at each sampling point, said apparatus comprising:

a plurality of analog memory elements each of said plurality of analog memory elements being disposed at one of said plurality of sampling points in a manner such that each of said plurality of analog memory elements has a different one of said plurality of sampling points associated therewith, each of said plurality of analog memory elements being adapted to have the stored contents thereof selectively varied in response to write-in pulses applied thereto and produce readout pulses at an output thereof representative of said stored contents in response to the application of read pulses thereto;

means for applying a write-in pulse to selected one of said plurality of analog memory elements in response to control signals applied thereto:

a plurality of branching means for appointing readout pulses received thereby into a plurality of output signals, each of said branching means being connected to the output of one said plurality of analog storage means, said plurality of output signals produced by each of said plurality of branching means being equal in number to said plurality of fundamental waveforms and each of said plurality of output signals produced by each of said plurality of branching means being associated with one of said plurality of fundamental waveforms, each of said plurality of branching means apportioning said readout pulses in relation to the values of the fundamental waveforms as associated with a resulting output signal as evaluated at a particular sampling point assigned to that branching means; and means for summing the output signals associated with common fundamental waveforms produced by each of said plurality of branching means.

2. The automatic waveform analyzing apparatus according to claim 1 wherein said means for summing said commonly associated output signals comprises a plurality of adder means, each of said plurality of adder means being associated with one of said plurality of fundamental waveforms, said plurality of adder means each including a plurality of input means and at least one output means, each of said plurality of input means being connected to a different one of said branching means so as to receive said commonly associated output signal therefrom, said commonly associated output signals received by each of said plurality of adder means being associated with the same fundamental waveform as that adder means.

3. The automatic waveform analyzing apparatus according to claim 2 additionally comprising a plurality of voltage divider means, each of said plurality of voltage divider means being connected to said output of one of said plurality of adder means, each of said plurality of voltage divider means being associated with one of said plurality of fundamental waveforms, and including a plurality of presettable taps, each of said presettable taps being associated with one of the plurality of selected sampling points and causing said voltage divider means to exhibit a selected amount of attenuation.

4. The automatic waveform analyzing apparatus according to claim 3 additionally including:

means for comparing the sum of the signals produced at corresponding presettable taps of each of said plurality of voltage divider means with a signal related to the value of the arbitrary waveform at a sampling point which is common to that associated with said corresponding presettable taps and producing an output pulse representative of the difference therebetween; and means for selectively connecting different corresponding presettable taps in said plurality of voltage divider means to said means for comparing.

5. The automatic waveform analyzing apparatus according to claim 4 additionally comprising means for applying control signals to said means for applying a write-in pulse to selected ones of said plurality of analog memory elements, said means for applying control signals being connected to said comparison means so as to receive the output signal representing the results of said comparison as an input signal thereto.

6. The automatic waveform analyzing apparatus according to claim 5 wherein said means for selectively connecting different corresponding presettable taps in said plurality of voltage divider means to said means for comparing additionally acts to determine the selected ones of said plurality of analog memory elements to receive a write-in pulse from said means for applying.

7. The automatic waveform analyzing apparatus according to claim 6 wherein the corresponding presettable taps in said plurality voltage divider means which are connected and the analog memory element selected to receive a write-in pulse are associated with a common sampling point.

8. The automatic waveform analyzing apparatus according to claim 7 wherein each of said plurality of analog memory elements includes ferromagnetic storage means.

9. The automatic waveform analyzing apparatus according to claim 8 wherein said ferromagnetic storage means comprises a multiaperture core.

10. The automatic waveform analyzing apparatus according to claim 9 wherein said means for applying a write-in pulse to selected ones of said plurality of analog memory elements in response to control signals applied thereto comprises:

switch means having a single input and a plurality of outputs said single input being selectively connected to only one of said plurality of outputs depending on the state of said which means, each of said plurality of outputs being connected to one of said plurality of analog memory elements and said state of switching means being controlled by said selectively connecting means;

write-in pulse generator means; and gating means interposed between said write-in pulse generator means and said single input of said switch means, said gating means including control signal input terminal means for controlling the state thereof connected to said means for applying control signals.

* * * * *